(12) United States Patent
Terasaki

(10) Patent No.: US 11,635,941 B2
(45) Date of Patent: Apr. 25, 2023

(54) CONTROLLER OF ARRAY INCLUDING NEUROMORPHIC ELEMENT, METHOD OF ARITHMETICALLY OPERATING DISCRETIZATION STEP SIZE, AND PROGRAM

(71) Applicant: TDK CORPORATION, Tokyo (JP)

(72) Inventor: Yukio Terasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 483 days.

(21) Appl. No.: 16/643,660

(22) PCT Filed: Feb. 19, 2018

(86) PCT No.: PCT/JP2018/005704
§ 371 (c)(1),
(2) Date: Mar. 2, 2020

(87) PCT Pub. No.: WO2019/043990
PCT Pub. Date: Mar. 7, 2019

(65) Prior Publication Data
US 2020/0272891 A1 Aug. 27, 2020

(30) Foreign Application Priority Data
Aug. 31, 2017 (JP) .............................. JP2017-167389

(51) Int. Cl.
*G06F 7/544* (2006.01)
*G06F 7/523* (2006.01)

(52) U.S. Cl.
CPC ............ *G06F 7/5443* (2013.01); *G06F 7/523* (2013.01)

(58) Field of Classification Search
CPC .............................. G06F 7/5443; G06F 7/523
See application file for complete search history.

(56) References Cited

U.S. PATENT DOCUMENTS

| 5,727,131 A | 3/1998 | Nakamura et al. |
| 2012/0109864 A1 | 5/2012 | Modha |

FOREIGN PATENT DOCUMENTS

| JP | 3070643 B2 | 7/2000 |
| JP | 5963315 B2 | 8/2016 |
| WO | 2012/055593 A1 | 5/2012 |

OTHER PUBLICATIONS

Apr. 24, 2018 Search Report issued in International Patent Application No. PCT/JP2018/005704.

*Primary Examiner* — Matthew D Sandifer
(74) *Attorney, Agent, or Firm* — Oliff PLC

(57) ABSTRACT

A controller is a controller of an array including a neuromorphic element that multiplies a weight based on a value of a variable characteristic by a signal, and includes a control unit that controls the characteristic of the neuromorphic element by using a discretization step size obtained so that a predetermined condition for reducing an error or a predetermined condition for improving accuracy is satisfied on the basis of a case where a true value of the weight obtained with a higher accuracy than a resolution of the characteristic of the neuromorphic element is used and a case where a discretization step size which is set for the characteristic of the neuromorphic element is used.

10 Claims, 12 Drawing Sheets

CONTROLLER OF ARRAY INCLUDING NEUROMORPHIC ELEMENT, METHOD OF ARITHMETICALLY OPERATING DISCRETIZATION STEP SIZE, AND PROGRAM

TECHNICAL FIELD

The present disclosure relates to a controller of an array including a neuromorphic element, a method of arithmetically operating a discretization step size, and a program.

The application is based on Japanese Patent Application No. 2017-167389 filed on Aug. 31, 2017, the content of which is incorporated herein by reference.

BACKGROUND ART

In the past, neural network techniques have been researched.

Advanced information identification and classification technologies using neural network techniques, including deep learning, have been put into practical use in a wide range of fields such as finance, marketing, authentication, and security. In such techniques, generally, enormous amounts of product-sum operations are required, and the product-sum operations are often executed using a cloud server or a huge computer.

In recent years, a new arithmetic operation mechanism capable of executing the above-described product-sum operations with low power and at a high speed using a neuromorphic element of which the conductance (reciprocal of resistance) changes in an analog manner has been studied. There is an attempt to realize low-power-consumption and high-speed signal processing by imitating a relationship between neurons and synapses in a human brain recognition process, and a wide range of studies, such as on techniques for imitating a structure of a neural network as a static network model or techniques for realizing a neuron firing model from the timing of a spike signal, have been conducted.

As an example, Patent Literature 1 discloses a method of loading a weight (connection weight) obtained through real number value simulation into a circuit chip of a neural network including a discrete value synapse device in a spike-type neural network, and the circuit chip includes a neuromorphic element (see Patent Literature 1).

However, one problem occurring in a case where a neuromorphic element is applied to a neural network is a resolution of a resistance change. That is, a resistance change of a neuromorphic element is not completely analog, but has discrete values like in a quantization step, and thus the use of a neuromorphic element in a neural network may result in the occurrence of a quantization error and deterioration of performance such as in identification.

For example, in a case where a neuromorphic element is used for a weight storage function and a weight updating function in a neural network, expressiveness of variables is insufficient as compared with a real-number-based simulation using a computer, and thus deterioration of identification performance or an increase in a period of time required until convergence may occur.

As an example, in a case where mnist characters (handwritten numbers) are recognized using a multi-layer perceptron (MLP) of three layers, it is understood that identification accuracy is reduced due to a resolution of a characteristic of a neuromorphic element.

CITATION LIST

Patent Literature

[Patent Literature 1]
International Publication No. 2012/055593

SUMMARY OF INVENTION

Technical Problem

As described above, in a case where a neuromorphic element is used in a product-sum operation, the accuracy of results may be reduced due to a quantization step for the neuromorphic element.

Meanwhile, in the related art, methods of assigning mathematically obtained weight values to a neuromorphic element have not been sufficiently studied.

The present disclosure is contrived in view of such circumstances, and an object thereof is to provide a controller of an array including a neuromorphic element, a method of arithmetically operating a discretization step size, and a program which are capable of improving the accuracy of results in a case where a neuromorphic element is used in a product-sum operation.

Solution to Problem

According to an aspect of the present disclosure, there is provided a controller of an array including a neuromorphic element that multiplies a weight based on a value of a variable characteristic by a signal, the controller including a control unit that controls the characteristic of the neuromorphic element by using the discretization step size obtained so that a predetermined condition for reducing an error or a predetermined condition for improving accuracy is satisfied on the basis of a case where a true value of the weight obtained with higher accuracy than a resolution of the characteristic of the neuromorphic element is used and a case where a discretization step size which is set for the characteristic of the neuromorphic element is used.

According to the aspect of the present disclosure, in the controller, the control unit may control the characteristic of the neuromorphic element by using a dynamic range of the neuromorphic element based on the discretization step size, the resolution, and a predetermined offset quantity.

According to the aspect of the present disclosure, in the controller, the control unit may control the characteristic of the neuromorphic element by using the discretization step size which is common to a plurality of layers in a case where the array includes the plurality of layers each including the neuromorphic element.

According to the aspect of the present disclosure, in the controller, the control unit may control the characteristic of the neuromorphic element by using the discretization step size which is common to groups into which a plurality of the neuromorphic elements included in the same layer are divided, in a case where the array includes a layer including the plurality of neuromorphic elements.

According to the aspect of the present disclosure, in the controller, the array may include a plurality of layers including the neuromorphic element, the neuromorphic element having a resolution which is common to the layers may be provided, and the resolution of the neuromorphic element in a different layer may be different.

According to the aspect of the present disclosure, in the controller, the control unit may perform learning on the array by using the discretization step size.

According to the aspect of the present disclosure, in the controller, the array may include a circuit that performs a product-sum operation in a neural network by using the neuromorphic element.

According to another aspect of the present disclosure, there is provided an arithmetic operation method of arithmetically operating a discretization step size of a characteristic of a neuromorphic element for an array including the neuromorphic element that multiplies a weight based on a value of a variable characteristic by a signal, the arithmetic operation method including a step of arithmetically operating a true value of the weight with higher accuracy than a resolution of the characteristic of the neuromorphic element, and a step of arithmetically operating a discretization step size so that a predetermined condition for reducing an error or a predetermined condition for improving accuracy is satisfied on the basis of a case where the true value of the weight is used and a case where the discretization step size which is set for the characteristic of the neuromorphic element is used.

According to still another aspect of the present disclosure, there is provided a program for arithmetically operating a discretization step size of a characteristic of a neuromorphic element for an array including the neuromorphic element that multiplies a weight based on a value of a variable characteristic by a signal, the program causing a computer to execute a step of arithmetically operating a true value of the weight with higher accuracy than a resolution of the characteristic of the neuromorphic element, and a step of arithmetically operating a discretization step size so that a predetermined condition for reducing an error or a predetermined condition for improving accuracy is satisfied on the basis of a case where the true value of the weight is used and a case where the discretization step size which is set for the characteristic of the neuromorphic element is used.

Advantageous Effects of Invention

According to the present disclosure, it is possible to improve the accuracy of results in a case where a neuromorphic element is used in a product-sum operation.

DESCRIPTION OF EMBODIMENTS

Hereinafter, an embodiment of the present disclosure will be described with reference to the accompanying drawings.

[Outline of Neural Network System]

Figure 1:
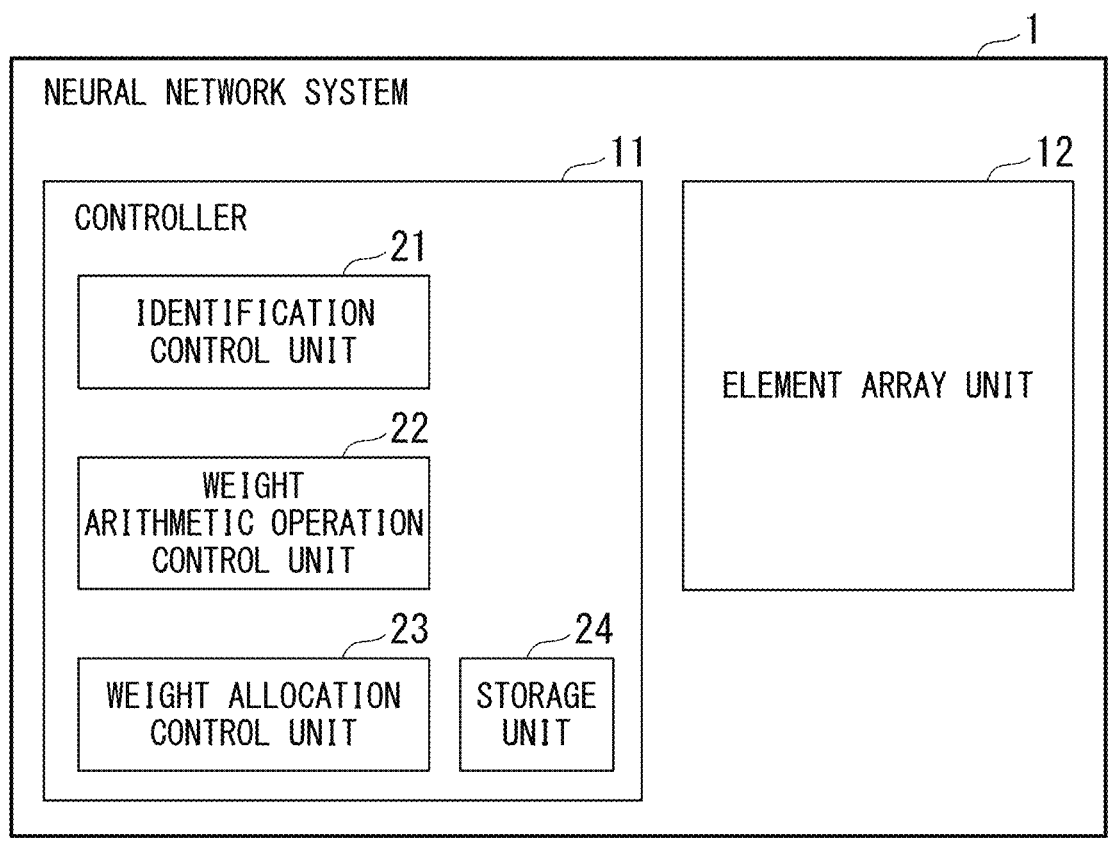
FIG. 1 is a block diagram showing a schematic configuration of a neural network system according to an embodiment of the present disclosure.

FIG. 1 is a block diagram showing a schematic configuration of a neural network system 1 according to an embodiment of the present disclosure.

The neural network system 1 includes a controller 11 and an element array unit 12.

The controller 11 includes an identification control unit 21, a weight arithmetic operation control unit 22, a weight allocation control unit 23, and a storage unit 24.

The element array unit 12 performs a product-sum operation in a neural network. The element array unit 12 includes a neuromorphic element.

The controller 11 performs control related to the element array unit 12.

The identification control unit 21 controls an identification process in a neural network.

The weight arithmetic operation control unit 22 controls a process of arithmetically operating (calculating) a weight allocated to the neuromorphic element.

The weight allocation control unit 23 allocates a weight to the neuromorphic element.

The storage unit 24 stores information. In the present embodiment, for convenience of description, one storage unit 24 is shown. However, as another configuration example, the controller 11 may include two or more storage units and the respective storage units may be used separately.

Figure 2:
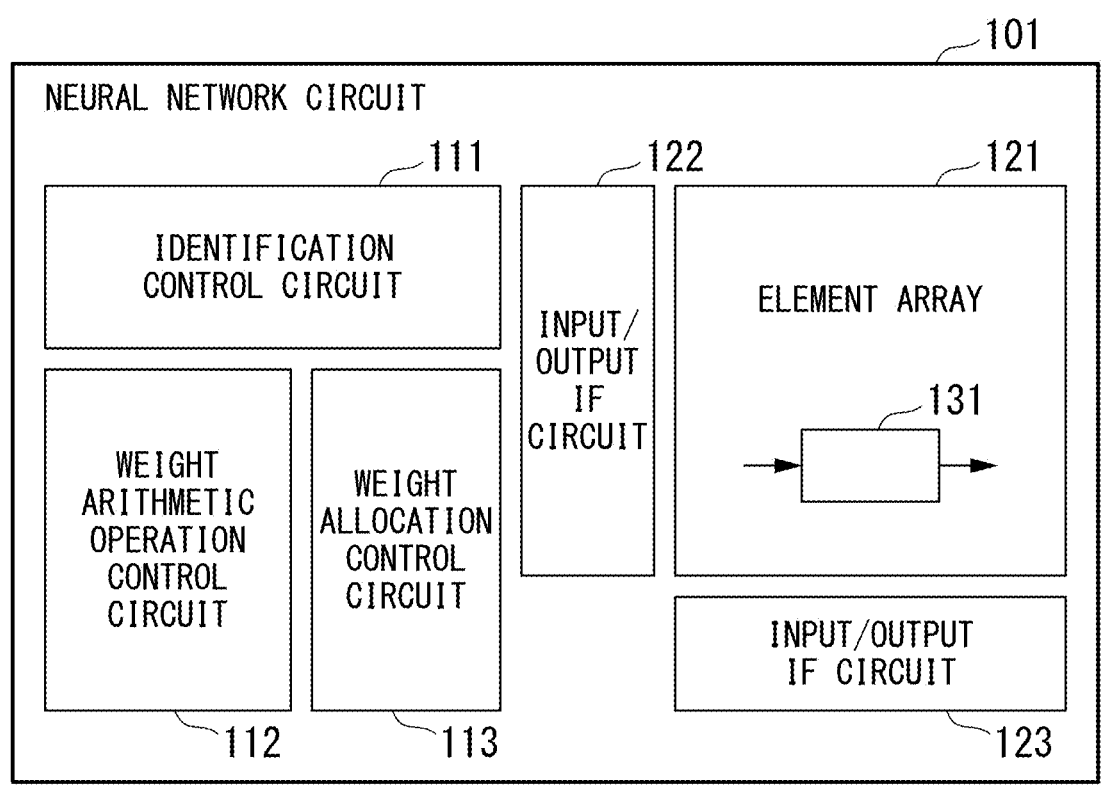
FIG. 2 is a block diagram showing a schematic configuration of a neural network circuit according to the embodiment of the present disclosure.

FIG. 2 is a block diagram showing a schematic configuration of a neural network circuit 101 according to the embodiment of the present disclosure.

The neural network circuit 101 shown in FIG. 2 is an example of a circuit equipped with a function of the neural network system 1 shown in FIG. 1.

The neural network circuit 101 includes an identification control circuit 111, a weight arithmetic operation control circuit 112, a weight allocation control circuit 113, an element array 121, an input and output interface circuit (input/output IF circuit) 122, and an input and output interface circuit (input/output IF circuit) 123.

In the examples of FIGS. 1 and 2, a function of the identification control unit 21 is realized by the identification control circuit 111, a function of the weight arithmetic operation control unit 22 is realized by the weight arithmetic operation control circuit 112, and a function of the weight allocation control unit 23 is realized by the weight allocation control circuit 113. Meanwhile, functions of the storage unit 24 are realized by being distributed to the identification control circuit 111, the weight arithmetic operation control circuit 112, and the weight allocation control circuit 113.

In the examples of FIGS. 1 and 2, a function of the element array unit 12 is realized by the element array 121 and the input/output IF circuits 122 to 123.

The element array 121 includes a plurality of neuromorphic elements.

Meanwhile, in the example of FIG. 2, only one neuromorphic element 131 is shown inside the element array 121. The neuromorphic element 131 multiplies the value of a weight by an input signal and outputs a signal having the value of the product as an output signal. The value of the weight is a value corresponding to the value of a variable characteristic of the neuromorphic element 131. The characteristic value of the neuromorphic element 131 changes by being controlled from the outside.

In the present embodiment, in the element array 121, a circuit that performs a product-sum operation corresponding to a desired neural network using a plurality of neuromorphic elements is configured. The input of a signal to the element array 121 and the output of a signal from the element array 121 are performed through the input/output IF circuits 122 and 123. As an example, the circuit of the element array 121 has a matrix shape, so that the input and output of a signal at one side of a matrix (for example, a vertical side) are performed through the input/output IF circuit 122, and the input and output of a signal at another side (for example, a horizontal side) of the matrix are performed through the input/output IF circuit 123.

Here, the identification control circuit 111, which is connected to the input/output IF circuits 122 and 123, outputs information to be identified to the element array 121 through the input/output IF circuits 122 and 123 and inputs information which is a result of an arithmetic operation performed by the element array 121 (identification result) on the basis of the information through the input/output IF circuits 122 and 123. In addition, the identification control circuit 111 performs the storage of input information (information which is an identification result) in the storage unit 24, execution of predetermined analysis based on input information (information which is an identification result), or the like.

In addition, the identification control circuit 111 has, for example, a function of performing learning (machine learning) on a neural network realized by the element array 121.

The weight arithmetic operation control circuit 112 is connected to the identification control circuit 111 and is connected to the weight allocation control circuit 113.

Further, in the present embodiment, the weight arithmetic operation control circuit 112 has a function of arithmetically operating a weight (connection weight) value in a neural network which is realized by the element array 121 with accuracy higher than a resolution of a characteristic of the neuromorphic element included in the element array 121. Further, in the present embodiment, the weight arithmetic operation control circuit 112 has a function of arithmetically operating an appropriate weight value to be allocated to the neuromorphic element included in the element array 121 (in the present embodiment, a weight value satisfying predetermined conditions related to an error or an identification accuracy).

Further, in the present embodiment, the weight arithmetic operation control circuit 112 has a function of updating (arithmetically operating) a weight value to be allocated to the neuromorphic element included in the element array 121 on the basis of information which is an identification result acquired by the identification control circuit 111 (for example, information regarding learning).

The weight allocation control circuit 113, which is connected to the input/output IF circuits 122 and 123, sets a weight value in the neuromorphic element included in the element array 121 through the input/output IF circuits 122 and 123. The weight allocation control circuit 113 uses a value arithmetically operated by the weight arithmetic operation control circuit 112 as the weight value.

As an example, the weight allocation control circuit 113 may transmit a predetermined signal to the neuromorphic element included in the element array 121 to set a weight value corresponding to the signal in the neuromorphic element. As the predetermined signal, any signal may be used, and for example, a signal of a voltage pulse may be used.

In the neuromorphic element, a characteristic (in the present embodiment, a conductance) of the neuromorphic element changes under the control of the weight allocation control circuit 113, so that a weight value changes. That is, in the neuromorphic element, a weight (value) corresponding to the characteristic of the neuromorphic element is multiplied by an input signal, and a signal which is the product thereof is output.

As a specific example, in a case where a neuromorphic element having a variable resistance R is used as a function of a multiplier, a conductance G ($=1/R$) of the neuromorphic element is used, a voltage V is input as an input signal to the neuromorphic element, and the magnitude of a current 1 ($=G \times V$) flowing through the neuromorphic element at that time is used as the product.

Meanwhile, in a configuration in which a plurality of neuromorphic elements are included in the element array 121, for example, each of the neuromorphic elements may be controlled, all of the neuromorphic elements may be collectively controlled, or the plurality of neuromorphic elements may be divided into two or more different groups and each of the groups may be collectively controlled.

Here, in a case where a neuromorphic element having a fluctuating variation of a characteristic is used, it is preferable that the neuromorphic element be controlled in view of this point. The fluctuating variation of a characteristic is, for example, an element having a nonlinear change in a characteristic.

As a specific example, in a neuromorphic element in which a variation ($\Delta G$) of conductance fluctuates, for example, a variation ($\Delta G$) of conductance with respect to a fixed variation of a voltage V applied to the neuromorphic element may increase as the value of conductance changes from a low value to a high value. In this case, as an example, in order to switch a variation ($\Delta G$) of conductance of the neuromorphic element at every interval of a fixed value, a configuration in which a variation of a voltage V applied to the neuromorphic element (a variation for each switching stage) decreases as the value of conductance changes from a low value to a high value may be used. Alternatively, a configuration in which a variation of a weight to be allocated undergoes fluctuation in response to a fluctuation in a variation A of conductance may be used.

Meanwhile, also in a case where a variation of a characteristic of the neuromorphic element fluctuates in another mode, control may be performed in accordance with the mode. Such a control method may be set in advance and stored in the storage unit 24 or the like.

Figure 3:
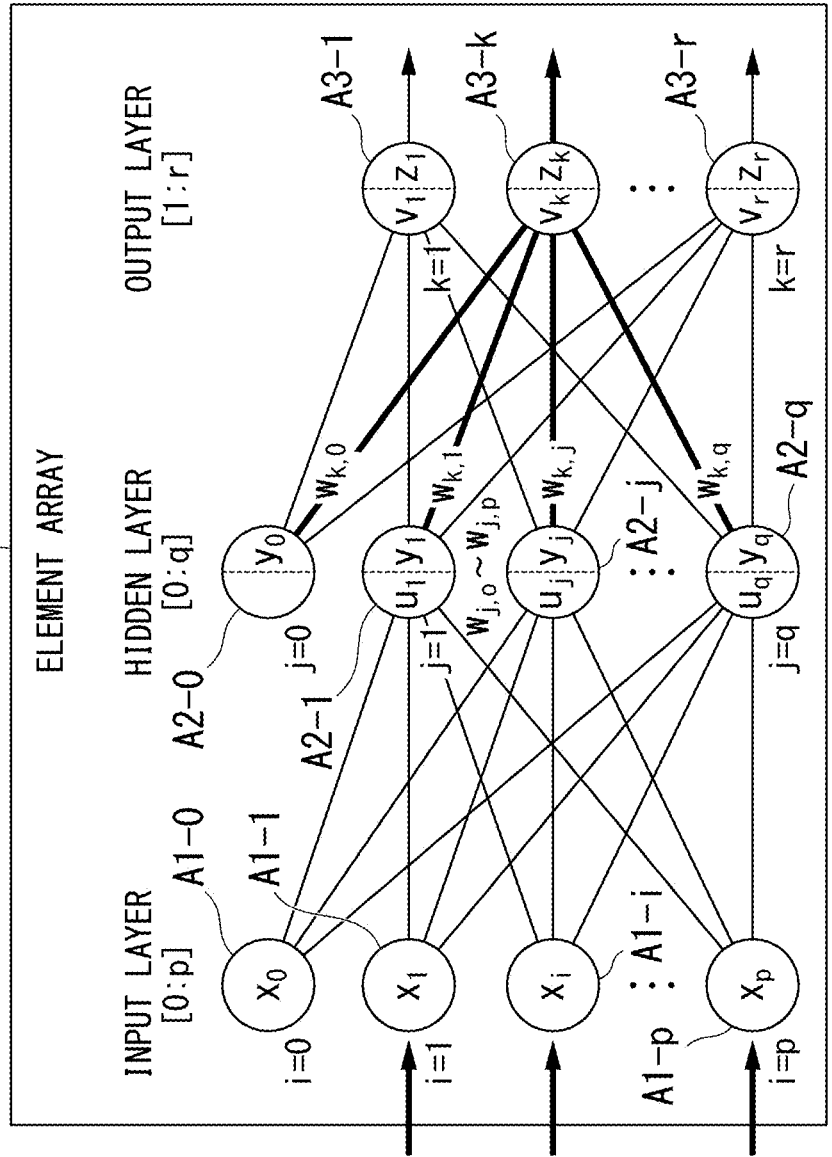
FIG. 3 is a block diagram showing a schematic configuration of an element array according to the embodiment of the present disclosure.
Figure 3:
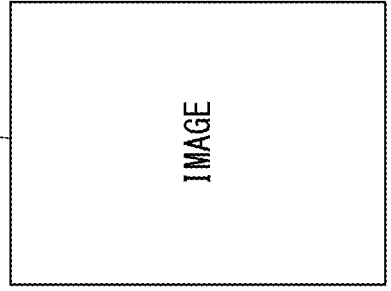

FIG. 3 is a block diagram showing a schematic configuration of the element array 121 according to the embodiment of the present disclosure.

Here, in the example of FIG. 3, the state of a product-sum operation performed in the element array 121 is conceptually shown. As a circuit configuration of the element array 121, any circuit configuration in which such a product-sum operation is realized may be used.

In the example of FIG. 3, an example using a perceptron of three layers is shown.

The element array 121 inputs p (p is an integer of 1 or greater) values (signals) and outputs r (r is an integer of 1 or greater) values (signals).

The element array 121 includes p units A1-1 to A1-$p$ and a unit A1-0 of one bias term in an input layer.

The element array 121 includes q units A2-1 to A2-$q$ and a unit A2-0 of one bias term in a hidden layer.

The element array 121 includes r units A3-1 to A3-$r$ in an output layer.

In the present embodiment, a circuit that performs an arithmetic operation realized by the p units A1-1 to A1-$p$, the q units A2-1 to A2-$q$, and the r units A3-1 to A3-$r$ is configured using a neuromorphic element. This arithmetic operation is, for example, a product-sum operation.

Meanwhile, in the present embodiment, a configuration of a neural network that outputs signals from each of the units in a layer at a front stage to all units (except for a unit of a bias term) in a layer at a rear stage is shown, but other configurations may be used. In the example of FIG. 3, signals are output from each of the units A1-0 to A1-$p$ in the input layer to the q units A2-1 to A2-$q$ in the hidden layer, and signals are output from each of the units A2-0 to A2-$q$ in the hidden layer to the r units A3-1 to A3-$r$ in the output layer.

Each of the units A1-1 to A1-$p$ in the input layer inputs and outputs each of the p input values (signals).

In addition, the unit A1-0 in the input layer outputs a predetermined value (signal).

Each of the units A2-1 to A2-$q$ in the hidden layer outputs values (signals) which are results obtained by performing a product-sum operation on output values (signals) from (p+1) units A1-0 to A1-$p$ in the input layer using a predetermined weight to the units A3-1 to A3-$r$ in the output layer. The product-sum operation is performed between the output of the input layer and the output of the hidden layer. For example, the weight may be different for each of the units A1-1 to A1-$p$ in the input layer or may be different for each of the units A2-1 to A2-$q$ in the hidden layer.

In addition, the unit A2-0 in the hidden layer outputs a predetermined value (signal).

Each of the units A3-1 to A3-$q$ in the output layer outputs values (signals) which are results obtained by performing a product-sum operation on output values (signals) from (q+1) units A2-0 to A2-$q$ in the hidden layer using a predetermined weight. The product-sum operation is performed between the output of the hidden layer and the output of the output layer. For example, the weight may be different for each of the units A2-1 to A2-$q$ in the hidden layer or may be different for each of the units A3-1 to A3-$r$ in the output layer.

The element array 121 inputs an image 211 and outputs information which is an identification result of the input image 211.

As an example, the image 211 is an image having 784 pixels (0th to 783rd pixels). In this case, the number of units (p) of the input layer is 784.

Further, in the example of FIG. 3, the information which is an identification result is r pieces of information which are output from the output layer.

Meanwhile, in a case where a neural network having a plurality of layers is configured, a weight corresponding to each of interlayers (for example, between a first layer and a second layer, and between the second layer and a third layer) may be configured, for example, using a separate array (for example, an array having a row of a plurality of neuromorphic elements for each interlayer) for each interlayer, or a configuration in which a set of arrays (for example, a set of arrays having a row of a plurality of neuromorphic elements) is virtually divided according to a time difference (time division) or the like and realizes weights corresponding to two or more interlayers may be used. Further, a configuration in which a set of arrays is spatially divided into a plurality of sub-arrays and realizes weights corresponding to two or more interlayers may be used. Similarly, in the present embodiment, for example, one neuromorphic element may be used to correspond to one weight, or may be virtually divided in accordance with a time difference (time division) or the like and used to correspond to two or more weights.

Figure 4:
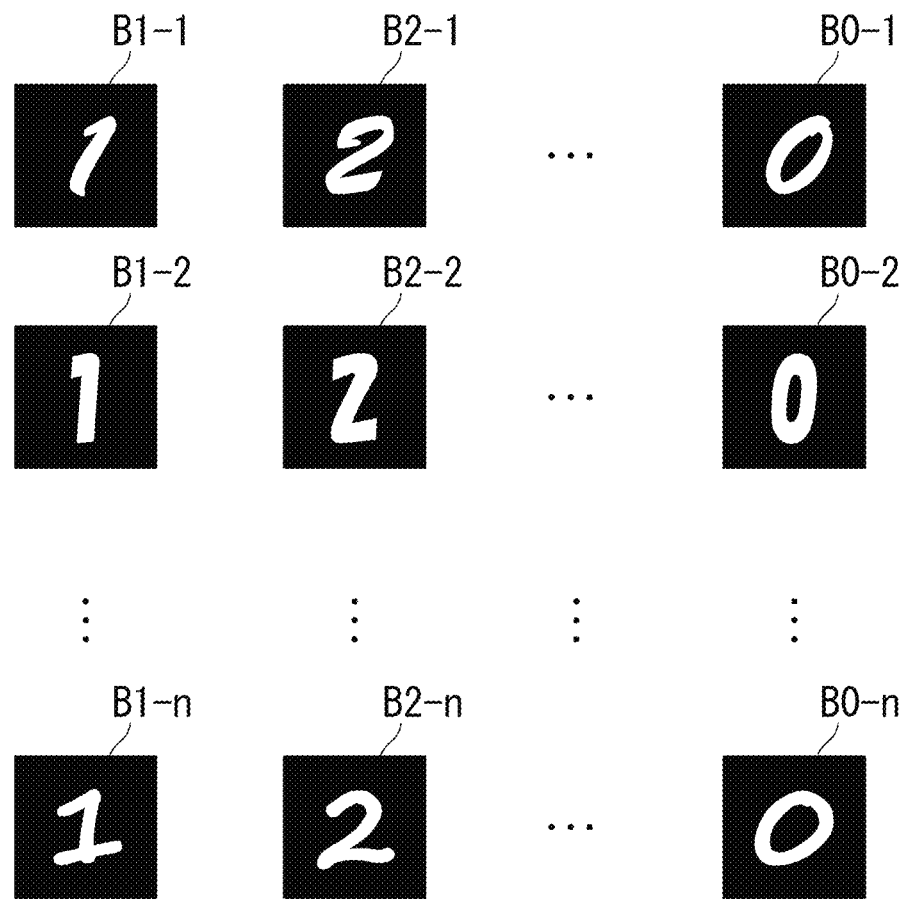
FIG. 4 is a diagram showing an example of an identification target image according to the embodiment of the present disclosure.

FIG. 4 is a diagram showing an example of identification target images B1-1 to B1-$n$, B2-1 to B2-$n$, . . . , and B0-1 to B0-$n$ (n is an integer of 2 or greater, for example, a sufficiently large number) according to the embodiment of the present disclosure.

The images B1-1 to B1-$n$ are images of a plurality of different handwriting patterns in a case where the numeral "1" is handwritten.

The images 132-1 to B2-$n$ are images of a plurality of different handwriting patterns in a case where the numeral "2" is handwritten.

The images B0-1 to B0-$n$ are images of a plurality of different handwriting patterns in a case where the numeral "0" is handwritten.

Meanwhile, in the example of FIG. 4, the numerals "3" to "9" are not shown. In addition, in the example of FIG. 4, the same number (n) of images are shown for all of the numerals "1" to "9" and "0," but a different number of images may be used for each of the numerals.

In the element array 121 shown in FIG. 3, in a case where images of the numerals "1" to "9" and "0" are used, for example, 10 is used as the number of (r) outputs from the output layer. In the identification control unit 21, these 10 outputs are respectively allocated to the 10 numerals ("1" to "9" and "0"), and the value of each of the outputs is regarded as a likelihood (possibility) of it being each numeral. Further, in the identification control unit 21, the number of the input image 211 is identified as the number corresponding to an output having the largest value among the ten outputs.

Meanwhile, while a configuration in which a larger output value corresponds to a higher likelihood is adopted here, in contrast, a configuration in which a larger output value corresponds to a lower likelihood may also be adopted.

In the present embodiment, as an example of such images, a case where images of mnist are used is shown.

Meanwhile, the images shown in FIG. 4 are not images of mnist itself, but images expressing handwritten numbers are shown for convenience of description.

Here, as a neuromorphic element, any element may be used. In addition, as a neuromorphic element, for example, a plurality of neuromorphic elements of one type may be used in combination, or a plurality of neuromorphic elements of two or more types may be used in combination.

As an example, an element using a phase change memory (PCM) that controls phase changes of a crystal and an amorphous material in a stepwise manner may be used as a neuromorphic element.

As another example, an element using a conductive bridge RAM (CBRAM) utilizing formation and extinction of a path between metal deposition and ionization by an electrochemical reaction may be used as a neuromorphic element.

As another example, an element using spintronics is also used as a neuromorphic element. For example, a domain wall type device that causes a linear resistance change by controlling a domain wall, or a spin orbit torque (SOT) type element that uses magnetization reversal by a spin orbit torque action has been studied. As another example, an element that uses a resistive random access memory (Re-RAM) using a resistance change by forming a filament by metal deposition on a medium such as $TaO_2$ may be used as a neuromorphic element.

In the present embodiment, a neuromorphic element capable of changing the value of conductance as a characteristic of an element is used, and a resolution of the change is finite.

Meanwhile, an element capable of changing any characteristic may be used as a neuromorphic element, and for example, an element capable of changing a characteristic such as a resistance or an optical phase may be used.

[Influence of Resolution of Characteristic of Neuromorphic Element on Performance]

The influence on performance of a neural network in a case where a neuromorphic element having a finite resolution is applied to the neural network will be described.

A neuromorphic element does not have a change characteristic of a complete analog linear conductance (G) and has a finite resolution. In a case where a resolution of a conductance change of the neuromorphic element (in the present embodiment, the number of bits) is determined, a dynamic range (overall width) of a value and a quantization step size (width of a quantization step) have a proportional relationship.

Here, when the quantization step size increases, the performance of a neural network is expected to deteriorate, and thus this can be considered as a problem of optimization of a dynamic range given to the neuromorphic element.

Here, conditions with a fixed resolution are assumed. The influence on identification performance is considered to be variable depending on a dynamic range (value range) allocated to a neuromorphic element of each layer.

Here, a transition of weight convergence is considered using a real number represented by a double precision floating point. A weight in each layer is realized by controlling a variable conductance of the neuromorphic element.

Meanwhile, in the present embodiment, a simulation using a real number is executed using a computer, and thus a "real number" in the simulation is not strictly a real number, but a value discretized due to a restriction on an arithmetic operation word length of the computer.

For example, a graph representing a maximum value, a minimum value, and an average value of a weight in a first layer, and a maximum value, a minimum value, and an average value of a weight in a second layer is considered (not shown in the drawing).

It is assumed that the resolution of a characteristic of a neuromorphic element is 5 (5 steps) in converting a weight into a model of the neuromorphic element. In addition, identification performance was evaluated assuming a plurality of different combinations as a dynamic range of the neuromorphic element. In a case where the resolution of a characteristic of the neuromorphic element is fixed, identification performance may greatly vary depending on a method of allocating a dynamic range.

Identification results in the calculation of a real number are as follows. Here, $(\pm U, \pm V)$ represents that a dynamic range of a weight in a first layer is $\pm U$, and a dynamic range of a weight in a second layer is $\pm V$. In addition, W [%] indicates the accuracy of identification results (identification accuracy).

$(\pm 2, \pm 2) 76.92[\%]$ $(\pm 1, \pm 2) 83.41[\%]$ $(\pm 2, \pm 1) 72.02[\%]$ $(\pm 1, \pm 1) 84.90[\%]$ $(\pm 0.5, \pm 0.5) 94.88[\%]$ $(\pm 0.5, \pm 0.3) 91.45[\%]$ $(\pm 0.3, \pm 0.5) 94.01[\%]$ $(\pm 0.3, \pm 0.3) 89.81[\%]$ $(\pm 0.1, \pm 0.1) 69.46[\%]$ $(\pm 0.05, \pm 0.05) 57.09[\%]$

From these results, the following conjectures are made.

The first conjecture is that theoretical values of an upper limit value and a lower limit value are not always optimum as a dynamic range allocated to the neuromorphic element, and a smaller dynamic range may also be advantageous. Although it is considered important that a quantization step size be small, an optimum value is considered to exist.

Another conjecture is that it may be advantageous to make a quantization step size in a first layer smaller than a quantization step size in a second layer.

Generally, in a neural network constituted by M layers (M is defined as an integer of 2 or greater), a first layer to an N-th layer (N is defined as an integer of 1 or greater and smaller than M) relate to feature extraction, and an (N+1)-th layer to an M-th layer relate to identification. The identification may depend on results of the feature extraction. In a case where the performance of feature extraction is good, identification performance can thereby be maintained at good performance to a certain extent. It is supposed that a resolution is more important for a higher layer, and a larger dynamic range is required for a lower layer.

From the above description, in the present embodiment, a problem of optimization of a dynamic range and a quantization step size allocated to a neuromorphic element is dealt with by fixing a resolution of a characteristic of the neuromorphic element.

Normally, in a neuromorphic element, when a quantization step size is reduced, an error of a weight is reduced, while a dynamic range of values that can be taken by a weight is reduced. Further, in a neuromorphic element, when a dynamic range is reduced, a possibility that a value arithmetically operated by the original weight value is fixed to an upper limit or a lower limit is increased, thereby resulting in erroneous identification. In the present embodiment, a satisfactory solution (preferably, an optimal solution) is obtained as described below.

[Outline of Arithmetic Operation of Identification Accuracy in Neural Network]

A neural network assumed in the present embodiment will be described. Meanwhile, in the present embodiment, the neural network shown in FIG. 3 is assumed.

The number of units in an input layer is set to be p, and one unit of a bias term is also provided.

The number of units in a hidden layer is set to be q, and one unit of a bias term is also provided.

The number of units in an output layer is set to be r.

Regarding a weight $w^{(L)}_{s,t}$, L represents the number of a layer, s represents the number of a unit of a layer on an output side, and t represents the number of a unit of a layer on an input side. Here, in the present embodiment, a portion between the input layer and the hidden layer is set to be a first layer (L=1), and a portion between the hidden layer and the output layer is set to be a second layer (L=2).

In the arithmetic operation of back-propagation, a bias term was represented by a zero-order term. Meanwhile, an output value of the bias term was always set to 1, and a weight between the bias term and each unit was also subject to learning.

Hereinafter, the influence of a resolution, a dynamic range, and a quantization step size of a weight on identification performance will be described.

The influence of an error of a weight on an output will be described.

It is assumed that $x_i$ (i=0, 1, 2, ..., and p) is a bias term and an output value (in the present embodiment, the same value as an input value) in an input layer, and $y_j$ (j=0, 1, 2, ..., and q) is a bias term and an output value in a hidden layer.

As shown in Expression (1), a quantization error (a term with a sign Δ) occurring due to a restriction of a resolution of a weight $w^{(2)}_{k,j}$ in a second layer is introduced.

An output value $z_k$ (k=1, 2, ..., and r) from a neural network is expressed by Expression (2).

[Math. 1]
$$w^{(2)}_{k,j} = \hat{w}^{(2)}_{k,j} + \Delta w^{(2)}_{k,j} \tag{1}$$

[Math. 2]
$$z_k = \sum_{j=0}^{q} w^{(2)}_{k,j} \cdot y_j \quad (k = 1, ..., r) \tag{2}$$
$$= \sum_{j=0}^{q} \left( \hat{w}^{(2)}_{k,j} + \Delta w^{(2)}_{k,j} \right) \cdot y_j \quad (k = 1, ..., r)$$

Next, an error of $y_j$ will be considered. In a case where a rectified linear unit (relu) is used as an activation function, $y_j$ is expressed as Expression (3) and Expression (4).

[Math. 3]
$$y_j = u_j (u_i \geq 0) \tag{3}$$
$$y_j = 0 (u_j < 0)$$

[Math. 4]
$$u_j = w^{(2)}_{j,i} \cdot x_0 + w^{(3)}_{j,i} \cdot x_1 + w^{(1)}_{j,2} \cdot x_2 + ... + w^{(1)}_{j,p} \cdot x_p \tag{4}$$
$$= \sum_{i=0}^{p} w^{(1)}_{j,i} \cdot x_i \quad (j = 1, ..., q)$$

Similarly to Expression (1), a quantization error (a term with a sign Δ) occurring due to a restriction of a resolution of a weight $w^{(1)}_{j,i}$ in a first layer is introduced. Thereby, it is expressed as Expression (5).

[Math. 5]
$$u_j = \sum_{i=0}^{p} w^{(1)}_{j,i} \cdot x_i \quad (j = 1, ..., q) \tag{5}$$
$$= \sum_{i=0}^{p} \left( \hat{w}^{(1)}_{j,i} + \Delta w^{(1)}_{j,i} \right) \cdot x_i \quad (j = 1, ..., q)$$

Therefore, an expression considering an error of an output value $z_k$ (k=1, 2, ..., and r) from a neural network is expressed as Expression (6).

Here, in a case where $u_j$<0, an output is 0, and thus this expression is established equivalently.

[Math. 6]
$$z_k = \sum_{j=0}^{q} \left( \hat{w}^{(2)}_{k,j} + \Delta w^{(2)}_{k,j} \right) \cdot y_j \tag{6}$$
$$= \sum_{j=0}^{q} \left[ \left( \hat{w}^{(2)}_{k,j} + \Delta w^{(2)}_{k,j} \right) \cdot \sum_{i=0}^{p} \left( \hat{w}^{(1)}_{j,i} + \Delta w^{(1)}_{j,i} \right) \cdot x_i \right]$$

When only a component ($\Delta z_k$) of an error of an output value $z_k$ (k=1, 2, ..., and r) from a neural network is extracted, the component is expressed as Expression (7).

[Math. 7]
$$\Delta z_k = \sum_{j=0}^{q} \left\{ \hat{w}^{(2)}_{k,j} \cdot \sum_{j=0}^{p} \Delta w^{(1)}_{j,i} \cdot x_i + \Delta w^{(2)}_{k,j} \cdot \sum_{i=0}^{p} \hat{w}^{(1)}_{j,i} \cdot x_i + \Delta w^{(2)}_{k,j} \cdot \sum_{i=0}^{p} \Delta w^{(1)}_{j,i} \cdot x_i \right\} \tag{7}$$
$$= \sum_{j=0}^{q} \hat{w}^{(2)}_{k,j} \cdot \sum_{i=0}^{p} \Delta w^{(1)}_{j,i} \cdot x_i + \sum_{j=0}^{q} \Delta w^{(2)}_{k,j} \cdot \sum_{i=0}^{p} \hat{w}^{(1)}_{j,i} \cdot x_i + \sum_{j=0}^{q} \Delta w^{(2)}_{k,j} \cdot \sum_{i=0}^{p} \Delta w^{(1)}_{j,i} \cdot x_i$$

Here, conversion shown in Expression (8) is performed by introducing α and β as parameters. In addition, α and β are assumed to constitute a uniform probability distribution satisfying conditions shown in Expression (9).

A component ($\Delta z_k$) of an error of an output value $z_k$ (k=1, 2, . . . , and r) from a neural network is expressed as Expression (10).

[Math. 8]

$$\Delta w_{j,i}^{(1)} = \alpha \cdot \dot{w}_{j,i}^{(1)}$$
$$\Delta w_{k,j}^{(2)} = \beta \cdot \dot{w}_{k,j}^{(2)}$$
(8)

[Math. 9]

$$|\alpha| \ll 1, |\beta| \ll 1$$
(9)

[Math. 10]

$$\Delta z_k = \sum_{j=0}^{q} \left\{ \dot{w}_{k,j}^{(2)} \cdot \sum_{j=0}^{p} \Delta w_{j,i}^{(1)} \cdot x_i + \Delta w_{k,j}^{(2)} \cdot \sum_{i=0}^{p} \dot{w}_{j,i}^{(1)} \cdot x_i + \Delta w_{k,j}^{(2)} \cdot \sum_{i=0}^{p} \Delta w_{j,i}^{(1)} \cdot x_i \right\}$$
$$= \sum_{j=0}^{q} \dot{w}_{k,j}^{(2)} \cdot \sum_{i=0}^{p} \alpha \cdot \dot{w}_{j,i}^{(1)} \cdot x_i + \sum_{j=0}^{q} \beta \cdot \dot{w}_{k,j}^{(2)} \cdot \sum_{i=0}^{p} \dot{w}_{j,i}^{(1)} \cdot x_i + \sum_{j=0}^{q} \beta \cdot \dot{w}_{k,j}^{(2)} \cdot \sum_{i=0}^{p} \alpha \cdot \dot{w}_{j,i}^{(1)} \cdot x_i$$
(10)

Here, when a term is evaluated for the last right-hand side of Expression (10), all elements of a product-sum operation term are the same. Considering Expression (9), a third term (a term including both α and β) is smaller than a first term (a term including α) and a second term (a term including β). Considering this, it is expressed as Expression (11).

[Math. 11]

$$\Delta z_k \approx \sum_{j=-}^{q} \dot{w}_{k,j}^{(2)} \cdot \sum_{i=0}^{p} \alpha \cdot \dot{w}_{j,i}^{(1)} \cdot x_i + \sum_{j=0}^{q} \beta \cdot \dot{w}_{k,j}^{(2)} \cdot \sum_{i=0}^{p} \dot{w}_{j,i}^{(1)} \cdot x_i$$
(11)

From Expression (11), it is shown that an output fluctuation due to a quantization error of a weight in each layer is arithmetically operated as the sum of a total sum of influences due to a quantization error in a first layer and a total sum of influences due to a quantization error in a second layer. Thereby, it is considered that a reduction in an output error (preferably, minimization) is realized by applying a solution for reducing (preferably, minimizing) an error (for example, a square error or the like) after quantization.

Here, an identification accuracy can be expressed by, for example, the value of ($1/\Delta z_k$) or a value proportional to the value.

In the present embodiment, the element array 121 includes one neuromorphic element for each combination of j and i for a weight $w_{j,i}^{(1)}$ in a first layer.

Similarly, in the present embodiment, the element array 121 includes one neuromorphic element for each combination of k and j for a weight $w_{k,j}^{(2)}$ in a second layer.

Meanwhile, in a case where there are two or more weight arithmetic operations that can be shared, neuromorphic elements may be shared by one neuromorphic element for these two or more weight arithmetic operations.

A method of obtaining the values of two parameters α and β will be described.

As an example, a method of arithmetically operating a value indicating a predetermined error by variously changing the values of two parameters α and β and obtaining the values of parameters α and β for reducing (preferably, minimizing) the value indicating the error may be used. In the method, for example, the values of two parameters α and β may be changed by round robin. Appropriate values of the parameters α and β are determined, so that an appropriate dynamic range to be set in a neuromorphic element is determined.

Meanwhile, a condition that a predetermined identification accuracy is increased (preferably, maximized) may be used instead of a condition that a value indicating a predetermined error is reduced (preferably, minimized).

As another example, in a case where there is a method for analytically obtaining the values of two parameters α and β, the analytic method thereof may be used.

Here, the values of two parameters α and β may vary depending on, for example, the number, contents, or the like of an identification target.

Generally, in a configuration of a neural network, an input layer includes units equivalent to pixels of image data to be identified, and the number of units decreases toward a hidden layer and an output layer.

As an example, in identification of a test set of mnist (a combination of images for performing a test), it is possible to achieve identification performance of 97 [%] or more in a real number arithmetic operation by setting the dimension of an input layer to be 784 units, setting the dimension of a hidden layer to be 100 units, and setting the dimension of an output layer to be 10 units.

In a case where a resolution and a dynamic range to be allocated to a neuromorphic element are determined, parameters α and β related to a quantization error are generated from the following two elements.

(Element 1) There is an element called a pure quantization error generated due to a quantization step size. This is a distribution that minimizes and maximizes an amount corresponding to (quantization step size/2).

(Element 2) In a case where a dynamic range to be allocated is narrower than a range based on a real number arithmetic value, there is an element called a rounding-down error generated in a value (real number arithmetic value) exceeding the dynamic range to be allocated.

Therefore, in a case where a resolution of a characteristic of a neuromorphic element is fixed, it is considered that an output error can be suppressed by determining a dynamic range to be allocated to the neuromorphic element so as to reduce (preferably minimize) a sum related to an error in each layer.

Meanwhile, a condition that a predetermined identification accuracy is increased (preferably, maximized) may be used instead of a condition that a value indicating a predetermined error is reduced (preferably, minimized).

[Distribution of Parameters α and β]

Figure 5:
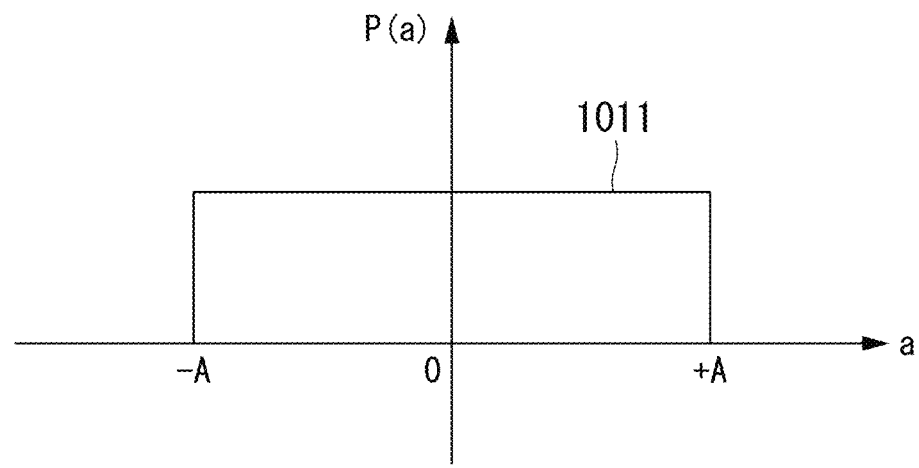
FIG. 5 is a diagram showing an example of a characteristic related to parameters α and β according to the embodiment of the present disclosure.

FIG. 5 is a diagram showing an example of a characteristic 1011 related to parameters α and β according to the embodiment of the present disclosure.

In a graph shown in FIG. 5, the horizontal axis represents a parameter a, and the vertical axis represents a function P(a). Further, in the example of FIG. 5, characteristic 1011 are shown. The characteristic 1011 is a characteristic having a fixed value between a=−A and a=+A by using A as a predetermined positive value. Here, weights in a neural network are generally initialized using normal random numbers or the like, and it is assumed that the values of the weights are uniformly distributed. In this case, it is assumed that quantization errors are also uniformly distributed. Meanwhile, this assumption is an example, and does not necessarily depend on the shape of distribution of quantization errors in the present embodiment. In addition, the characteristic 1011 is a probability density function in which the overall probability is 1.

Here, (2×A) is a quantization step size, and a relationship of {(2×A)×resolution=dynamic range} is established.

From Expression (8), parameters α and β indicate a ratio of error components to true values of weights. Thus, when the parameters α and β are set to have positive values, each of the parameters α and β is equivalent to (2×A)/dynamic range width. That is, each of the parameters α and β is a value corresponding to a quantization step size.

Meanwhile, here, for convenience of description, description has been given using a common letter A for two parameters α and β, but the values of two parameters α and β are made different in the present embodiment.

First Example of Procedure of Allocating Dynamic Range to Neuromorphic Element

As a first example of a procedure of allocating a dynamic range to a neuromorphic element, (a procedure 1 in the first example) to (a procedure 8 in the first example) is shown. Meanwhile, when similar results are obtained, the order of the procedures may be different.

In the present example (first example), an arithmetic operation method based on quantization errors of weights of layers is used as an example of an arithmetic operation method.

In the present example, processes of the following procedure are performed using a computer by a user operating the computer. Meanwhile, some or all of operations performed by a user may be automatically performed by a computer.

Here, in the present embodiment, such a computer is, for example, a computer included in the neural network circuit 101, and is a computer included in the weight arithmetic operation control circuit 112 as an example. As another example, a computer different from that included in the neural network circuit 101 may be used as such a computer. Meanwhile, the computer may be, for example, a microcomputer or the like.

Further, in the present example, description will be given on the assumption that such a computer has a function of a predetermined real number simulator and the real number simulator executes processes of (the procedure 1 in the first example) to (the procedure 8 in the first example). Meanwhile, these processes may be performed by, for example, a function other than the real number simulator or may be performed by an arbitrary function (generally, two or more different functions) for each of the processes. In addition, these processes may be performed by, for example, any computer (generally, two or more different computers) for each of the processes.

(The procedure 1 in the first example) A user defines a structure of a neural network in the real number simulator. Here, examples of the structure of the neural network include a type, the number of layers, structures of the layers, the number of units, and the like. Further, in the present example, the real number simulator is realized using a computer and executes a numerical arithmetic operation of a simulation in the defined neural network by using a real number.

(The procedure 2 in the first example) The user performs neural network learning by using learning data by the real number simulator to obtain a true value of a weight. Here, the true value of the weight is, for example, the value of the weight when a function representing a predetermined error converges. Any function may be used as the function representing the predetermined error. In addition, any data may be used as the learning data.

(The procedure 3 in the first example) The user determines the range of a quantization step size for searching for an optimum solution and sets the range in the real number simulator. As a specific example, in a case where the range of a true value of a weight is −1 to +1 and a resolution of a characteristic of the neuromorphic element is 5, a quantization step size is 0.4 (=⅖) when using these values. For example, a searching range is set to 0.04 to 4 or the like.

(The procedure 4 in the first example) The user arithmetically operates a weight value discretized by a resolution for a true value of the weight as {(quantization step size× resolution)=(dynamic range of weight to be allocated to neuromorphic element)} by the real number simulator.

(The procedure 5 in the first example) The user arithmetically operates a function related to an error by the real number simulator. As an example, a function for setting a result obtained by adding an error between a discretized weight value and a true value for all weights as an overall error (hereinafter, also referred to as an error total sum) may be used as a function related to an error. As another example, a function for setting a result obtained by adding a square value of an error between a discretized weight value and a true value for all weights as an overall error (hereinafter, also referred to as an error square total sum) may be used as a function related to an error.

(The procedure 6 in the first example) The user determines the value of a quantization step size for minimizing the value of a function related to an error (in the present embodiment, an error total sum or an error square total sum) by the real number simulator. Here, as a method of determining the value of a quantization step size, for example, a method of determining a value by selecting one value from among candidates of a plurality of values may be used.

Meanwhile, in the present example, as an example of a preferred mode, a mode in which the value of a quantization step size for minimizing the value of an error (the value of a function related to an error) is determined is used. However, as another example, a mode in which the value of a quantization step size for reducing the value of an error (the value of a function related to an error) is determined on the basis of a predetermined condition may be used. As the predetermined condition, any condition may be used, and for example, a condition that the value of an error (the value of a function related to an error) is set to be equal to or less than a predetermined threshold value (or less than the predetermined threshold value) may be used.

(The procedure 7 in the first example) The user adopts the determined value of the quantization step size by the real number simulator and allocates a dynamic range to the neuromorphic element with {(quantization step size×resolution)=(dynamic range of weight to be allocated to neuromorphic element)}. As a specific example, in a case where a quantization step size is 0.25 and a resolution is 5, a dynamic range is 1.25 (=0.25×5).

(The procedure 8 in the first example) The user converts a dynamic range allocated to the neuromorphic element by the real number simulator into a range with 0 as the center (a lower limit value Wmin to an upper limit value Wmax). Here, since the range has 0 as the center, a relationship of |Wmin|=|Wmax| is established. When Z is an arbitrary value, |Z| represents an absolute value of Z. In addition, the user sets a conductance value Gmin corresponding to the lower limit value Wmin of the range of the dynamic range and sets a conductance value Gmax corresponding to the upper limit value Wmax of the range of the dynamic range as the values of conductances of the neuromorphic element by the real number simulator.

Second Example of Procedure of Allocating Dynamic Range to Neuromorphic Element

As a second example of a procedure of allocating a dynamic range to a neuromorphic element, (a procedure 1 in the second example) to (a procedure 5 in the second example) are shown. Meanwhile, when similar results are obtained, the order of the procedures may be different.

In the present example (second example), an arithmetic operation method using an identification accuracy is used as another example of an arithmetic operation method. Meanwhile, as another example, an arithmetic operation method using a total sum of errors or a total sum of squares of errors for an output at a final stage may be used.

In the present example, processes of the following procedure are performed using a computer by a user operating the computer. Meanwhile, some or all of operations performed by a user may be automatically performed by a computer.

Here, in the present embodiment, such a computer is, for example, a computer included in the neural network circuit 101, and is a computer included in the weight arithmetic operation control circuit 112 as an example. As another example, a computer different from that included in the neural network circuit 101 may be used as such a computer.

Further, in the present example, description will be given on the assumption that such a computer has a function of a predetermined real number simulator and the real number simulator executes processes of (the procedure 1 in the second example) to (the procedure 5 in the second example). Meanwhile, these processes may be performed by, for example, a function other than the real number simulator or may be performed by an arbitrary function (generally, two or more different functions) for each of the processes. In addition, these processes may be performed by, for example, any computer (generally, two or more different computers) for each of the processes.

(The procedure 1 in the second example) is similar to (the procedure 1 in the first example).

(The procedure 2 in the second example) is similar to (the procedure 2 in the first example).

(The procedure 3 in the second example) The user inputs data to a neural network configured using a true value of a weight by the real number simulator and arithmetically operates an output from the neural network (an output in a case where quantization is not performed).

(The procedure 4 in the second example) The user inputs data to a function representing an output using parameters $\alpha$ and $\beta$ by using a true value of a weight by the real number simulator and arithmetically operates the output (an output in a case where quantization is performed). For example, the output is an output of an expression obtained by introducing parameters $\alpha$ and $\beta$ into Expression (6) (an output value $z_k$ of a number r of an identification class).

(The procedure 5 in the second example) The user determines a quantization step size for reducing (preferably, minimizing) a value related to an error between an output value obtained by (the procedure 3 in the second example) and an output value obtained by (the procedure 4 in the second example) by the real number simulator. As the value related to an error, for example, a total sum of errors or a total sum of squares of errors for an output at a final stage may be used. In addition, as a method of determining the value of a quantization step size, for example, a method of determining a value by selecting one value from among candidates of a plurality of values may be used.

Here, as another example, $\Delta z_k$ shown in Expression (11) may be used as the value related to an error.

In addition, as another example, in the above-described (the procedure 5 in the second example), the user may determine a quantization step size for increasing an identification accuracy (preferably, maximizing) in a case where quantization is performed by the real number simulator.

Meanwhile, as a condition that a value related to an error is decreased, for example, a condition that a value related to an error is set to be equal to or less than a predetermined threshold value (or less than the predetermined threshold value) may be used.

In addition, as a condition that an identification accuracy is increased, for example, a condition that an identification accuracy is set to be equal to or greater than a predetermined threshold value (or greater than the predetermined threshold value) may be used.

[Condition Using Error and Condition Using Identification Accuracy]

An example of results of a simulation in which a condition using an error is set and an example of results of a simulation in which a condition using an identification accuracy is set are shown.

As a simulation in which a condition using an error is set, a simulation for searching for a dynamic range in which a total sum of squares of errors is minimized was performed. As a result, an optimum dynamic range in the first layer was 0.42, an optimum dynamic range in the second layer was 0.96, and an identification accuracy was 95.64 [%].

On the other hand, as a simulation in which a condition using an identification accuracy is set, a simulation for searching for a dynamic range in which an identification accuracy is maximized was performed. As a result, an optimum dynamic range in the first layer was 0.42, an optimum dynamic range in the second layer was 0.96, and an identification accuracy was 95.64 [%].

Here, both were identical to each other. For this reason, it is estimated that a satisfactory identification accuracy is realized by adopting a dynamic range in which a condition using an error is satisfied.

Specific Example of Allocation of Dynamic Range to Neuromorphic Element

Figure 6:
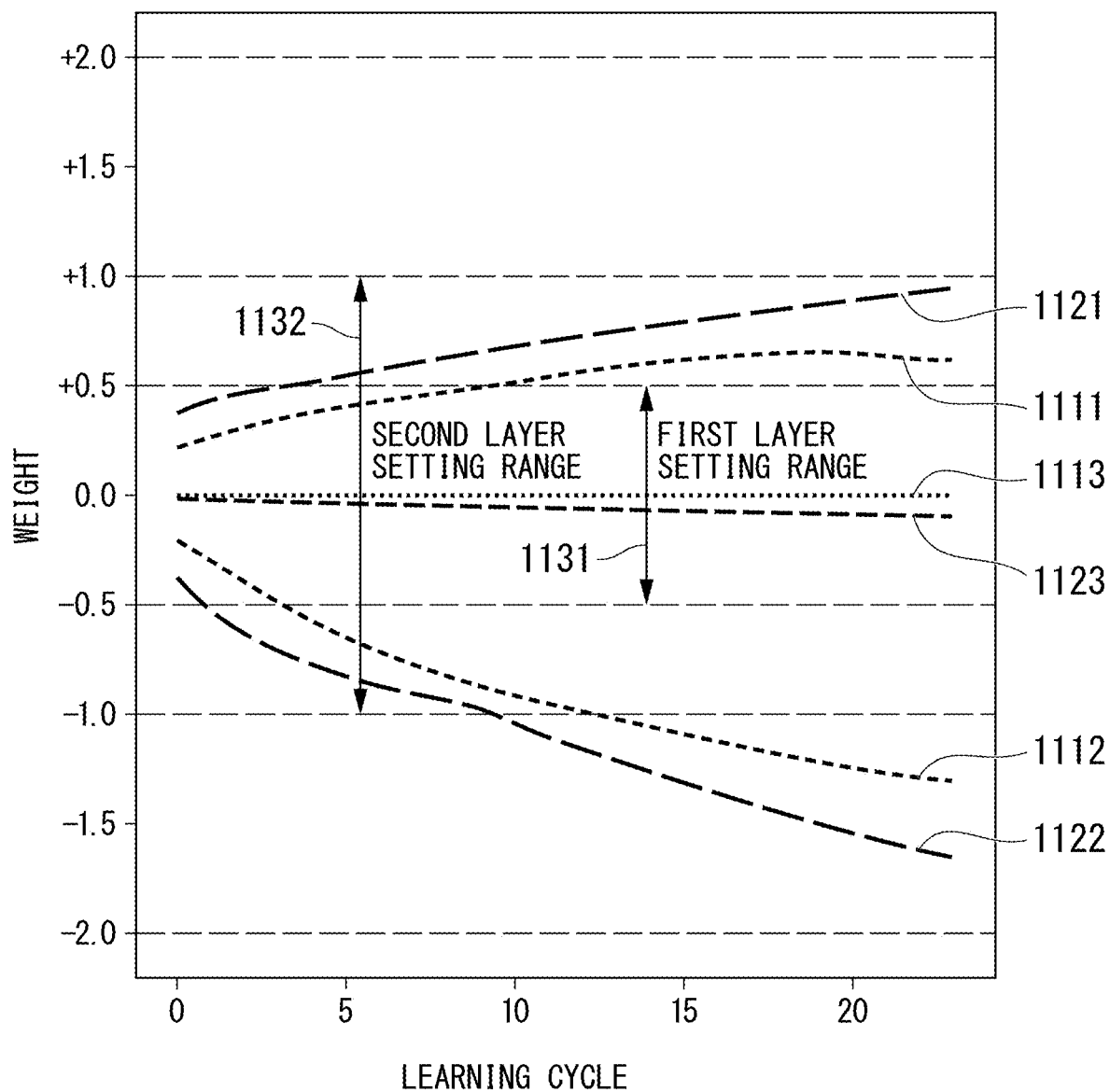
FIG. 6 is a diagram showing an example of results of learning of weights according to the embodiment of the present disclosure.

FIG. 6 is a diagram showing an example of results of learning of weights according to the embodiment of the present disclosure.

In a graph shown in FIG. 6, the horizontal axis represents a learning cycle (in the present embodiment, the number of epochs), and the vertical axis represents a weight value.

Meanwhile, an epoch represents a unit of processing for minimizing an error of a neural network for one identification target (for example, one image) for training.

In the example of FIG. 6, as characteristics of true values acquired by a simulation using a real number, a characteristic 1111 of a maximum value of a weight in the first layer, a characteristic 1112 of a minimum value of a weight in the first layer, a characteristic 1121 of a maximum value of a weight in the second layer, and a characteristic 1122 of a minimum value of a weight in the second layer are shown.

Further, in the example of FIG. 6, a dynamic range which is set in the neuromorphic element in the first layer is set to be "a range between equal to or greater than −0.5 and equal to or less than +0.5", and a dynamic range which is set in the neuromorphic element in the second layer is set to be "a range between equal to or greater than −1.0 and equal to or less than +1.0". In the example of FIG. 6, a range 1131 equivalent to a dynamic range which is set in the neuromorphic element in the first layer, and a range 1132 equivalent to a dynamic range which is set in the neuromorphic element in the second layer are shown.

Figure 7:
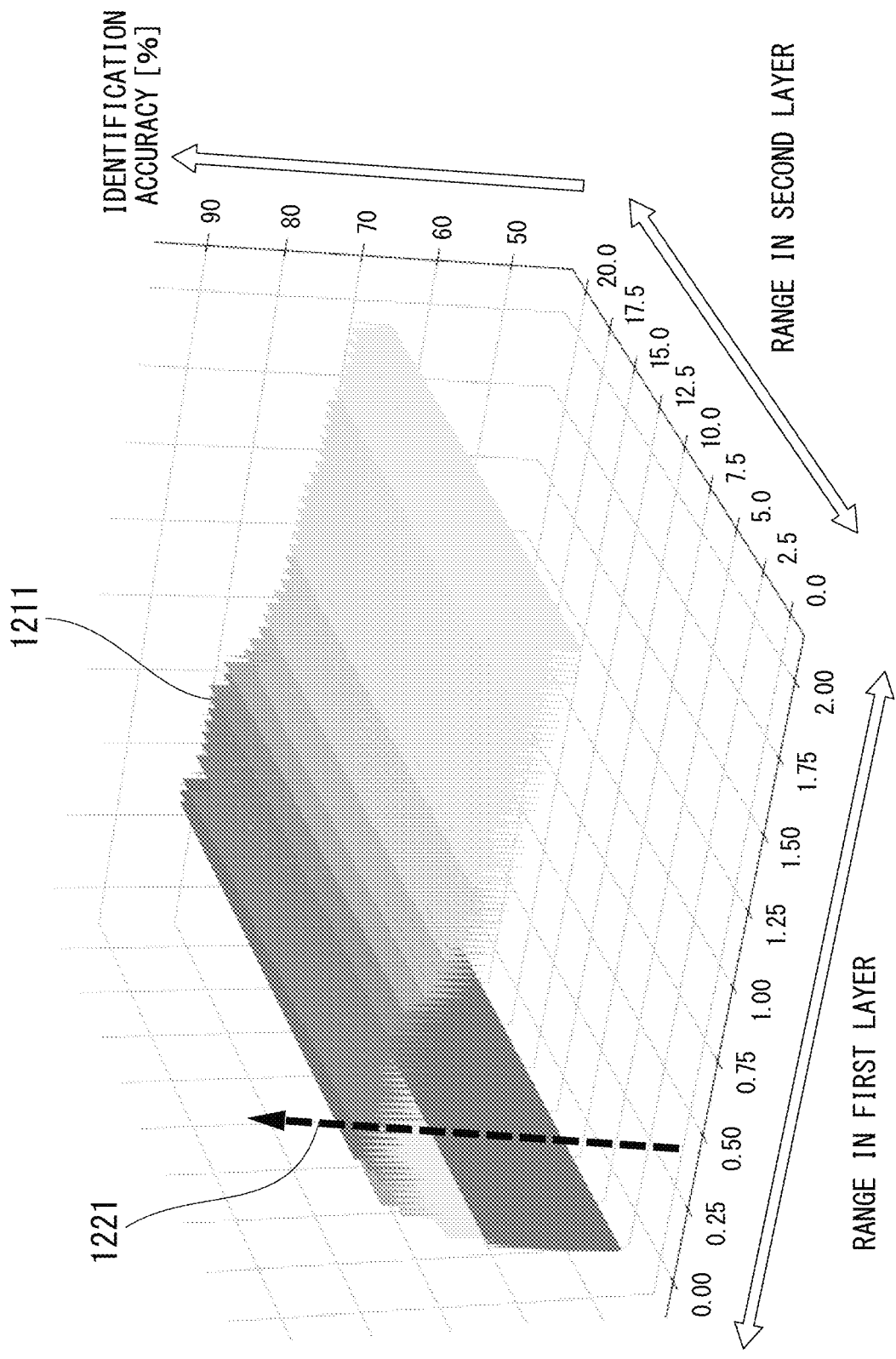
FIG. 7 is a diagram showing an example of identification accuracy based on a dynamic range which is set in a neuromorphic element according to the embodiment of the present disclosure.

FIG. 7 is a diagram showing an example of an identification accuracy based on a dynamic range which is set in a neuromorphic element according to the embodiment of the present disclosure.

In a graph shown in FIG. 7, among two types of horizontal axes, one axis represents a dynamic range (the range of the first layer) which is set in a neuromorphic element in a first layer, and the other axis represents a dynamic range (the range of the second layer) which is set in a neuromorphic element in a second layer. In addition, the vertical axis represents an identification accuracy [%] which is obtained through the setting of such a dynamic range.

In the example of FIG. 7, a characteristic 1211 representing a relationship of these three axes is shown, and an arrow 1221 is shown at a position where an identification accuracy is maximized (meanwhile, in the example of FIG. 7, the arrow 1221 is not parallel to the vertical axis).

In the example of FIG. 7, a dynamic range of the first layer is "a range between equal to or greater than −0.42 and equal to or less than +0.42", a dynamic range of the second layer is "a range between equal to or greater than −0.96 and equal to or less than +0.96", and an identification accuracy is "95.64 [%]" at a position where an identification accuracy is maximized.

Next, reference will be made to FIGS. 8 to 11 to describe that the performance of a neural network circuit becomes satisfactory in a case where a dynamic range is different for each of a plurality of layers.

First, FIGS. 8 and 9 will be described.

Figure 8:
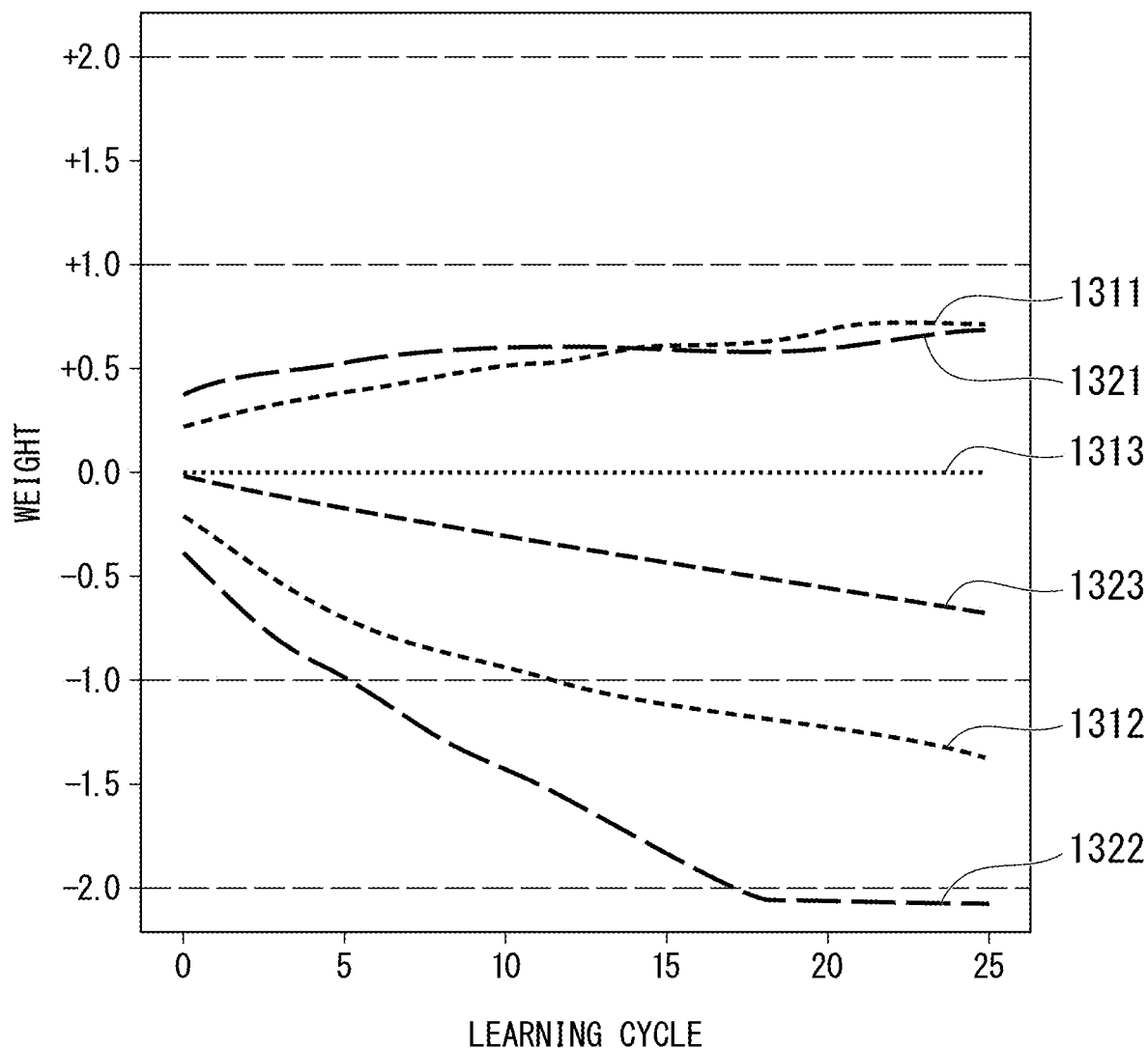
FIG. 8 is a diagram showing an example of results in a case where the same dynamic range is set in a neuromorphic element for all layers.
Figure 9:
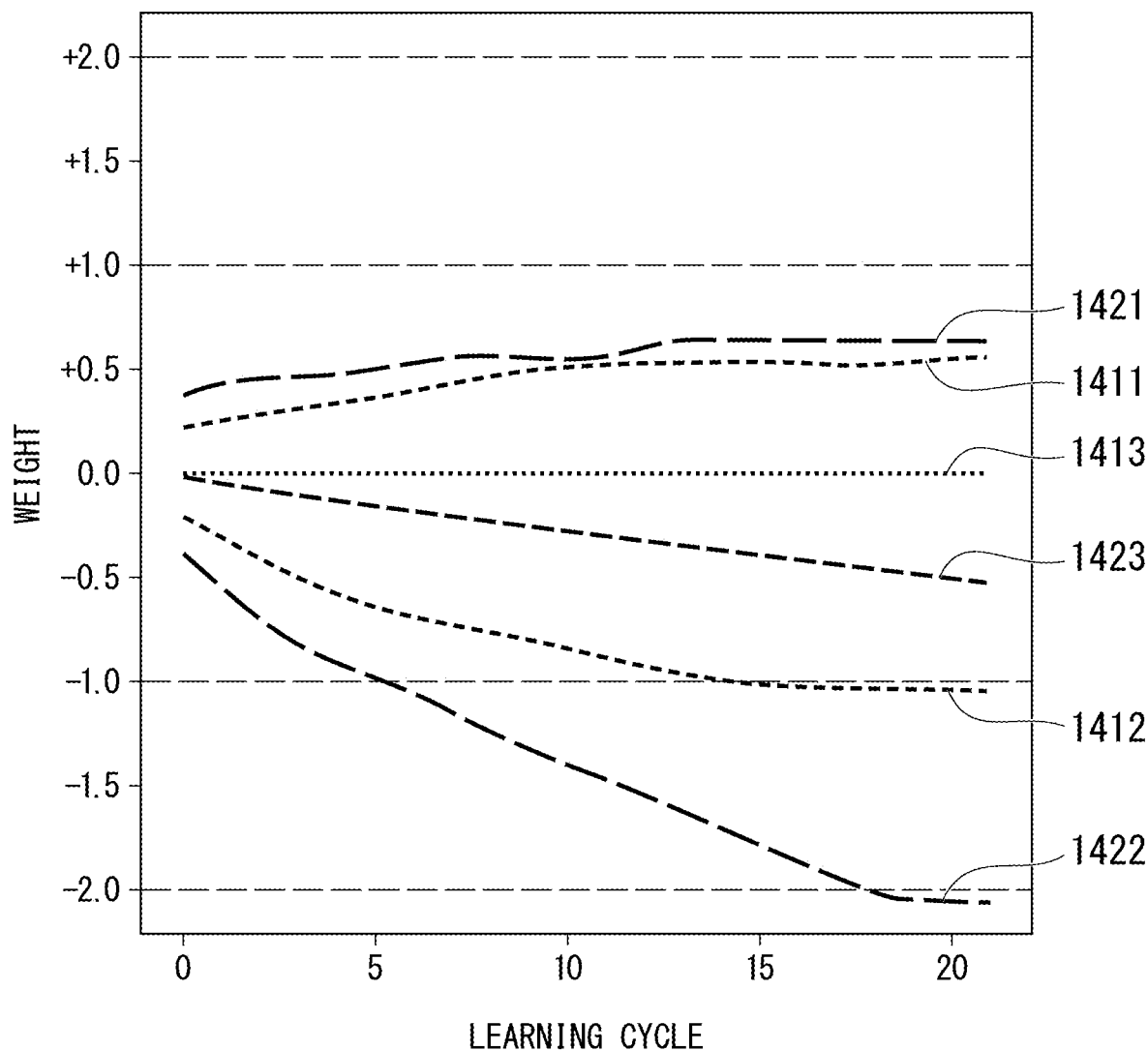
FIG. 9 is a diagram showing an example of results in a case where different dynamic ranges are set in a neuromorphic element for layers according to the embodiment of the present disclosure.

In examples of FIGS. 8 and 9, it is assumed that the resolution of a characteristic of a neuromorphic element is 100 steps.

FIG. 8 is a diagram showing an example of results in a case where the same dynamic range is set in a neuromorphic element for all layers (in the present embodiment, first and second layers).

FIG. 9 is a diagram showing an example of results in a case where different dynamic ranges are set in a neuromorphic element for layers (in the present embodiment, first and second layers) according to the embodiment of the present disclosure.

In graphs shown in FIGS. 8 and 9, the horizontal axis represents a learning cycle (in the present embodiment, the number of epochs), and the vertical axis represents a weight value.

In the example of FIG. 8, a dynamic range which is set in neuromorphic elements in the first and second layers is set to be "a range between equal to or greater than −2.0 and equal to or less than +2.0".

In the example of FIG. 8, for learning of a circuit of a neural network including a neuromorphic element, a characteristic 1311 of a maximum value of a weight in the first layer, a characteristic 1312 of a minimum value of a weight in the first layer, a characteristic 1313 of an average value of a weight in the first layer, a characteristic 1321 of a maximum value of a weight in the second layer, a characteristic 1322 of a minimum value of a weight in the second layer, and a characteristic 1323 of an average value of a weight in the second layer are shown.

In the example of FIG. 8, an identification accuracy is "92.6 [%]".

In the example of FIG. 9, a dynamic range which is set in the neuromorphic element in the first layer is set to be "a range between equal to or greater than −1.0 and equal to or less than +1.0", and a dynamic range which is set in the neuromorphic element in the second layer is set to be "a range between equal to or greater than −2.0 and equal to or less than +2.0".

In the example of FIG. 9, for learning of a circuit of a neural network including a neuromorphic element, a characteristic 1411 of a maximum value of a weight in the first layer, a characteristic 1412 of a minimum value of a weight in the first layer, a characteristic 1413 of an average value of a weight in the first layer, a characteristic 1421 of a maximum value of a weight in the second layer, a characteristic 1422 of a minimum value of a weight in the second layer, and a characteristic 1423 of an average value of a weight in the second layer are shown.

In the example of FIG. 9, an identification accuracy is "96.6 [%]".

Next, FIGS. 10 and 11 will be described.

Figure 10:
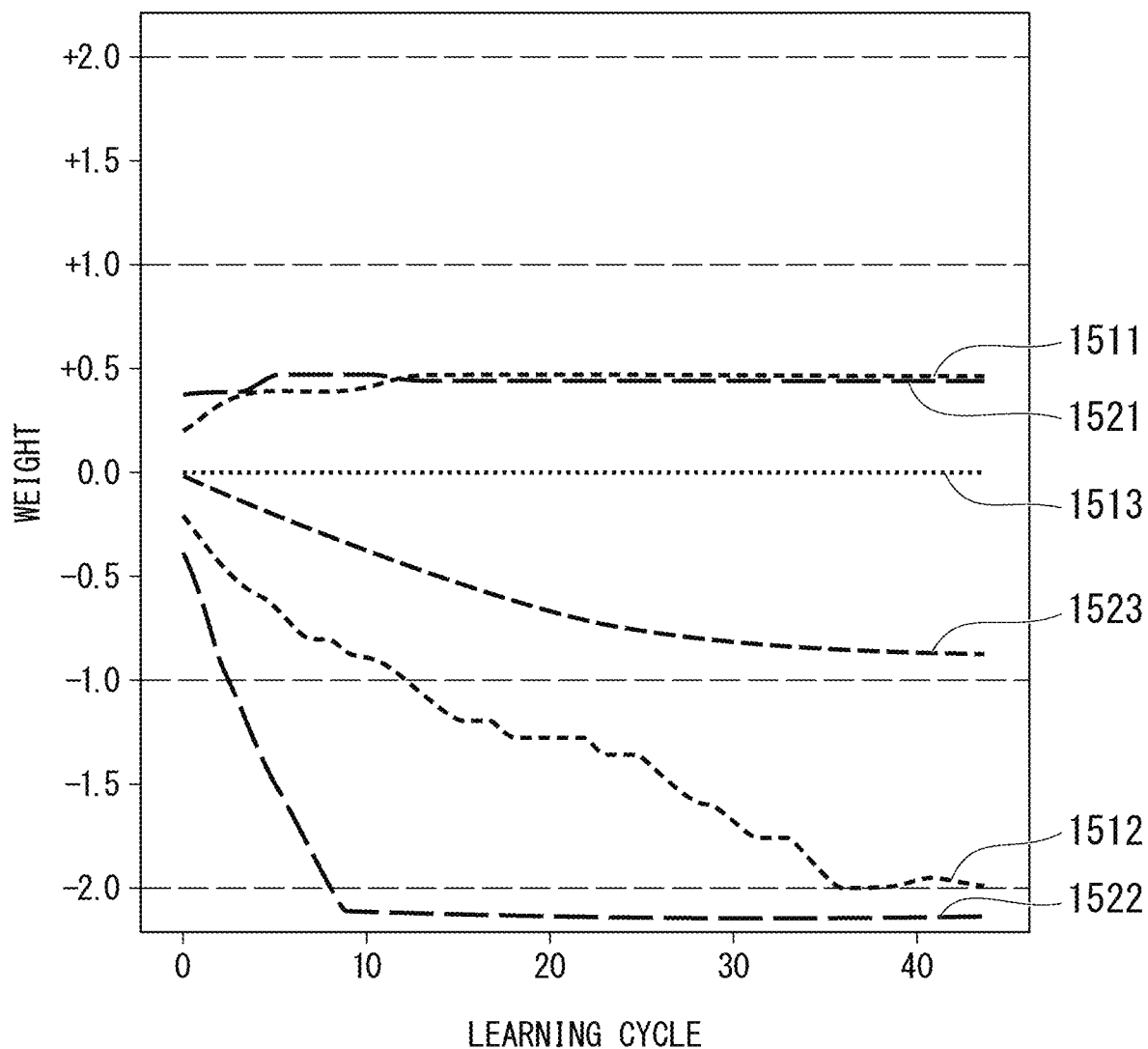
FIG. 10 is a diagram showing another example of results in a case where the same dynamic range is set in a neuromorphic element for all layers.
Figure 11:
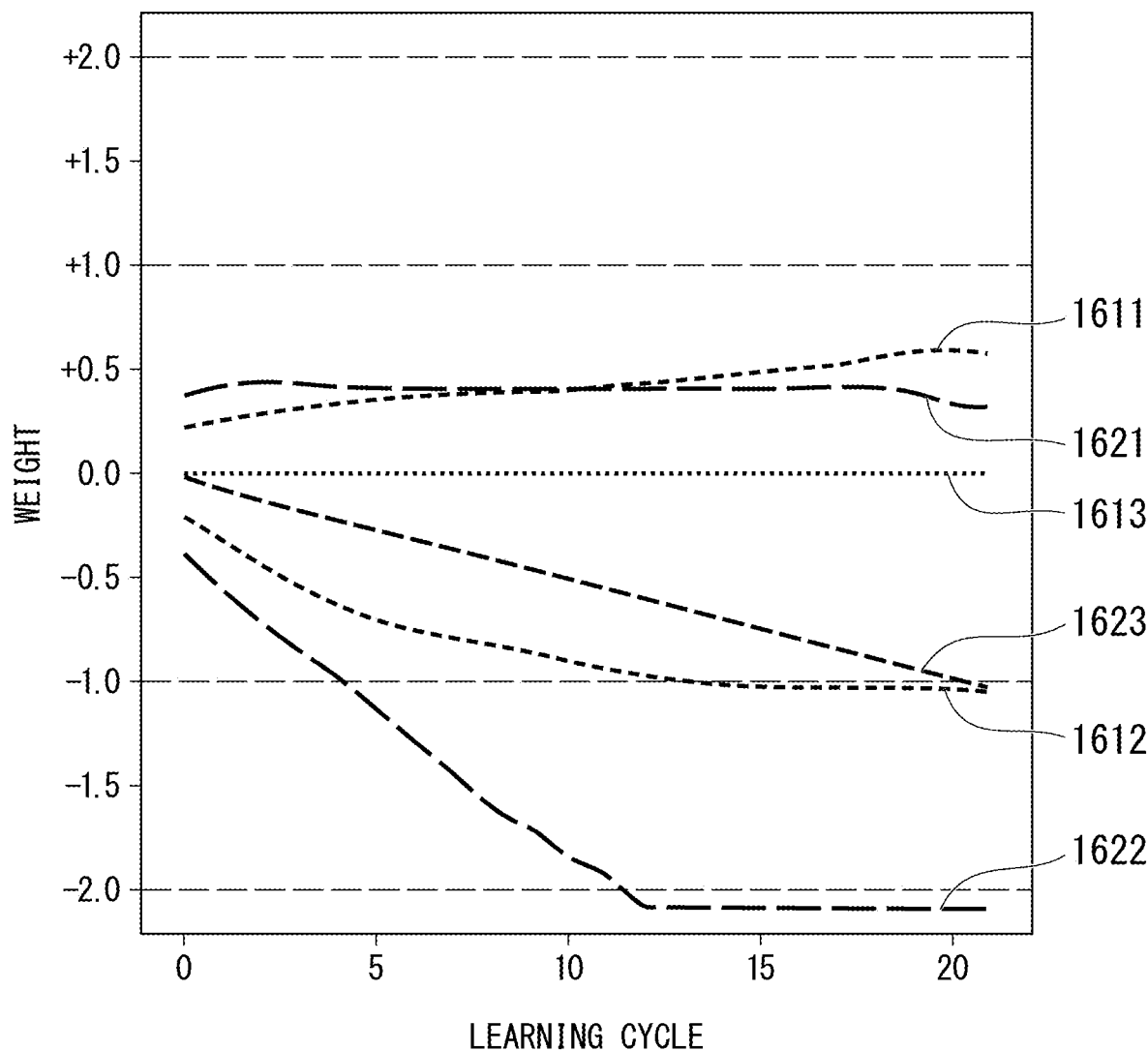
FIG. 11 is a diagram showing another example of results in a case where different dynamic ranges are set in a neuromorphic element for layers according to the embodiment of the present disclosure.

In examples of FIGS. 10 and 11, it is assumed that the resolution of a characteristic of a neuromorphic element is 50 steps.

FIG. 10 is a diagram showing another example of results in a case where the same dynamic range is set in a neuromorphic element for all layers (in the present embodiment, first and second layers).

FIG. 11 is a diagram showing another example of results in a case where different dynamic ranges are set in a neuromorphic element for layers (in the present embodiment, first and second layers) according to the embodiment of the present disclosure.

In graphs shown in FIGS. 10 and 11, the horizontal axis represents a learning cycle (in the present embodiment, the number of epochs), and the vertical axis represents a weight value.

In the example of FIG. 10, a dynamic range which is set in neuromorphic elements in the first and second layers is set to be "a range between equal to or greater than −2.0 and equal to or less than +2.0".

In the example of FIG. 10, for learning of a circuit of a neural network including a neuromorphic element, a characteristic 1511 of a maximum value of a weight in the first layer, a characteristic 1512 of a minimum value of a weight in the first layer, a characteristic 1513 of an average value of a weight in the first layer, a characteristic 1521 of a maximum value of a weight in the second layer, a characteristic 1522 of a minimum value of a weight in the second layer, and a characteristic 1523 of an average value of a weight in the second layer are shown.

In the example of FIG. 10, an identification accuracy is "65.3 [%]".

In the example of FIG. 11, a dynamic range which is set in the neuromorphic element in the first layer is set to be "a range between equal to or greater than −1.0 and equal to or less than +1.0", and a dynamic range which is set in the neuromorphic element in the second layer is set to be "a range between equal to or greater than −2.0 and equal to or less than +2.0".

In the example of FIG. 11, for learning of a circuit of a neural network including a neuromorphic element, a characteristic 1611 of a maximum value of a weight in the first layer, a characteristic 1612 of a minimum value of a weight in the first layer, a characteristic 1613 of an average value of a weight in the first layer, a characteristic 1621 of a maximum value of a weight in the second layer, a characteristic 1622 of a minimum value of a weight in the second layer, and a characteristic 1623 of an average value of a weight in the second layer are shown.

In the example of FIG. 11, an identification accuracy is "90.8 [%]".

Here, FIGS. 8 to 11 show results of a simulation, one weight updating occurs unnecessarily due to circumstances of conditions of the simulation. For this reason, in the examples of FIGS. 8 to 11, a characteristic protrudes to the outside of a set dynamic range (in the present example, "a range between equal to or greater than −2.0 and equal to or less than +2.0" or "a range between equal to or greater than −1.0 and equal to or less than +1.0"), but this is simply due to circumstances of the simulation and does not show accurate values. Thereby, in results of the present simulation, some values are not accurate, but the overall tendency of characteristics is shown.

Here, as shown in the examples of FIGS. 8 to 11, identification performance may become more satisfactory in a case where different dynamic ranges are set in a neuromorphic element for all layers (in the present embodiment, first and second layers) than in a case where the same dynamic range is set in a neuromorphic element for all layers (in the present embodiment, first and second layers).

[Offset Quantity of Dynamic Range]

In the above description, a case where a dynamic range which is set in a neuromorphic element is "a range between equal to or greater than −B and equal to or less than +B" (B is defined as any positive value) and the central value of the dynamic range is 0 has been described. An offset quantity of the dynamic range in this case is assumed to be 0.

On the other hand, an offset quantity may be set for a dynamic range which is set in a neuromorphic element. In this case, the central value of the dynamic range deviates from 0 by an offset quantity.

Meanwhile, in the present embodiment, it is assumed that the width of a dynamic range is fixed regardless of the magnitude of an offset quantity.

For example, when a dynamic range is "a range between equal to or greater than −B and equal to or less than +B" in a case where an offset quantity is 0, a dynamic range is set to be "a range between equal to or greater than (−B+C) and equal to or less than (+B+C)" in a case where an offset quantity is not 0 but C (C is a positive value or a negative value).

An identification accuracy may become higher when an offset quantity of a dynamic range is not 0 than when an offset quantity of a dynamic range is 0.

Figure 12:
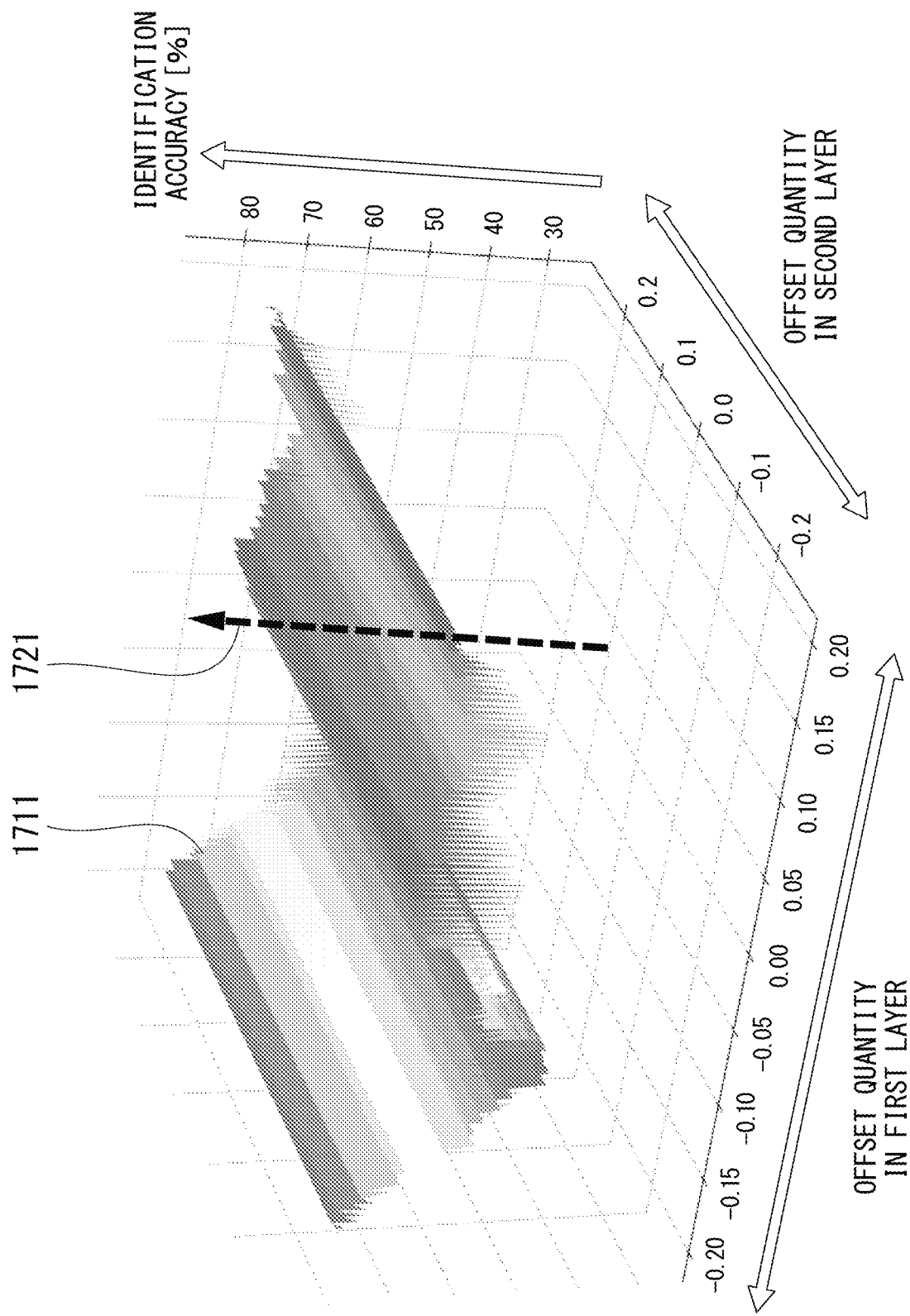
FIG. 12 is a diagram showing another example of identification accuracy based on an offset quantity in a dynamic range which is set in a neuromorphic element according to the embodiment of the present disclosure.

FIG. 12 is a diagram showing another example of an identification accuracy based on an offset quantity in a dynamic range which is set in a neuromorphic element according to the embodiment of the present disclosure.

In a graph shown in FIG. 12, among two types of horizontal axes, one axis represents an offset quantity (an offset quantity of a first layer) of a dynamic range which is set in a neuromorphic element in the first layer, and the other axis represents an offset quantity (an offset quantity of a second layer) of a dynamic range which is set in a neuromorphic element in the second layer. In addition, the vertical axis represents an identification accuracy [%] which is obtained through the setting of such an offset quantity.

In the example of FIG. 12, a characteristic 1711 representing a relationship of these three axes is shown, and an arrow 1721 is shown at a position where an identification accuracy is maximized (meanwhile, in the example of FIG. 12, the arrow 1721 is not parallel to the vertical axis).

In the example of FIG. 12, an offset quantity of the first layer is "0.0038", an offset quantity of the second layer is "0.1196", and an identification accuracy is "87.98 [%]" at a position where an identification accuracy is maximized.

Here, in the present embodiment, a computer arithmetically operates an offset quantity of a dynamic range which is set in a neuromorphic element. A function of arithmetically operating such an offset quantity may be a function which is realized by, for example, a real number simulator. Meanwhile, such a computer may be, for example, a computer which is included in the neural network circuit 101 (for example, the weight arithmetic operation control circuit 112) or may be any of other computers.

In the present embodiment, a computer sets a value equivalent to an average value of a weight value (true value) in a neural network realized by the element array 121 as an offset quantity on the basis of results obtained by arithmetically operating the weight value (true value) with higher accuracy than that of the resolution of a characteristic of the neuromorphic element included in the element array 121.

As another example, a method of arithmetically operating a value representing a predetermined error by variously changing offset quantities of dynamic ranges in layers by a computer and obtaining an offset quantity for reducing (preferably, minimizing) the value indicating the error by a computer may be used. Meanwhile, an offset quantity for increasing (preferably, maximizing) an identification accuracy may be obtained instead of an offset quantity for reducing (preferably, minimizing) a value indicating an error.

[Post Learning]

In the neural network circuit 101, a weight may be tuned by performing post learning after a dynamic range is allocated to the neuromorphic element included in the element array 121.

Here, any method may be used as a method of performing tuning.

[Storage of Information]

In the neural network circuit 101, information such as a dynamic range (the width of the dynamic range, an offset quantity) which is allocated to the neuromorphic element included in the element array 121, a quantization step size, a resolution, and a step number which is set in each neuromorphic element may be stored in a storage unit (a memory or the like equivalent to the storage unit 24).

[Setting of Dynamic Range for Plurality of Neuromorphic Elements]

The element array 121 includes, for example, a plurality of layers, and each of the layers includes a plurality of neuromorphic elements (a plurality of units).

As an example, for a neuromorphic element included in a neural network having a plurality of layers, a common discretization step size may be used for each of the layers to obtain and set a common dynamic range (for example, the width of the dynamic range, an offset quantity).

As another example, a plurality of neuromorphic elements included in each of the layers are divided into two or more groups, and a common discretization step size may be used for each of the groups to obtain and set a common dynamic range (for example, the width of the dynamic range, an offset quantity). In this case, in the same layer, a plurality of neuromorphic elements included in the layer are divided into two or more groups. Thereby, for example, a different dynamic range can be set depending on the degree of importance (contribution) of each unit, or the like.

As another example, any variable discretization step size may be used for each neuromorphic element to obtain and set any variable dynamic range (for example, the width of the dynamic range, an offset quantity). Thereby, a different dynamic range can be set depending on, for example, the degree of importance (contribution) of each neuromorphic element, or the like.

Example of Procedure of Processing Performed in Neural Network Circuit

Figure 13:
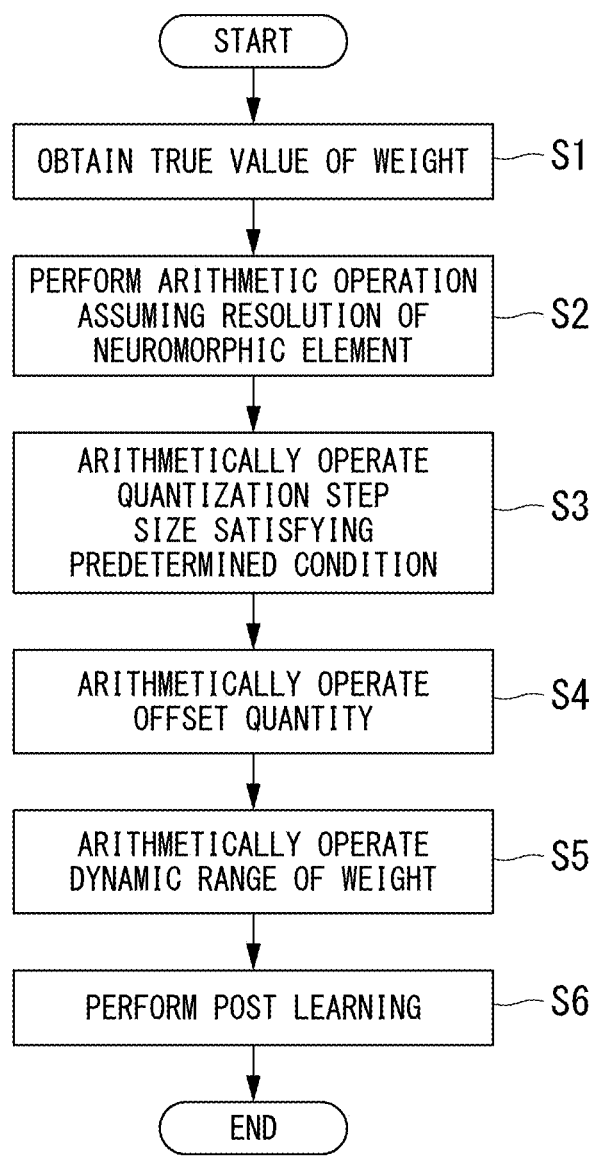
FIG. 13 is a diagram showing an example of a procedure of processing performed in a neural network circuit according to the embodiment of the present disclosure.

FIG. 13 is a diagram showing an example of a procedure of processing performed in the neural network circuit 101 according to the embodiment of the present disclosure.

(Step S1)

A computer arithmetically operates a weight value (true value) in a neural network realized by the element array 121 with higher accuracy than that of the resolution of a characteristic of the neuromorphic element included in the element array 121.

(Step S2)

The computer performs an arithmetic operation assuming the resolution of a characteristic of the neuromorphic element included in the element array 121. Thereby, for example, the computer arithmetically operates a function related to an error or a function related to an identification accuracy for a case where the resolution of a characteristic of the neuromorphic element included in the element array 121 is assumed.

(Step S3)

The computer arithmetically operates a quantization step size satisfying a predetermined condition for the neuromorphic element included in the element array 121. As the predetermined condition, for example, either one or both of a condition related to an error or a condition related to an identification accuracy may be used.

(Step S4)

The computer arithmetically operates an offset quantity of a dynamic range for the neuromorphic element included in the element array 121.

Here, in a case where an offset quantity is set to be a predetermined value (for example, 0) in advance, the process of step S4 may be omitted.

(Step S5)

The computer arithmetically operates a dynamic range of a weight. In this case, the dynamic range is arithmetically operated on the basis of, for example, a resolution, a quantization step size, and an offset quantity.

(Step S6)

The arithmetically operated dynamic range is set in the neural network circuit 101. In addition, the neural network circuit 101 performs predetermined post learning on a neural network realized by the element array 121.

Meanwhile, in a case where post learning is not necessary, the process of step S6 may be omitted.

Here, in a case where results of an arithmetic operation for a dynamic range is obtained by a computer separate from the neural network circuit 101, the arithmetically operated dynamic range is set in the neural network circuit 101 by a user, the computer, or the like. In this case, for example, off chip learning may be performed. That is, an arithmetic operation such as learning may be executed by a high-accuracy calculator (computer) such as for a real number which is provided separately from the neural network circuit 101, and results of the arithmetic operation may be set in the neural network circuit 101.

CONCLUSION OF EMBODIMENT

As described above, in the neural network system 1 according to the present embodiment, in a configuration in which a weight (connection weight) is realized by a neuromorphic element having a finite resolution, an appropriate discretization step size is determined on the basis of a case where a true value of a connection weight obtained by a real number simulator or the like with higher accuracy than that of the resolution is used and a case where a discretization step size which is set for a characteristic of the neuromorphic element is used. In addition, a dynamic range (the width of the dynamic range) is determined on the basis of the determined discretization step size and the resolution. In addition, a dynamic range (the width of the dynamic range and an offset quantity, and an upper limit value and a lower limit value) is determined on the basis of an offset quantity (0 or a value other than 0) of the dynamic range.

Further, in the neural network system 1 according to the present embodiment, the value of a characteristic (in the present embodiment, a conductance) of a neuromorphic element is controlled on the basis of the determined dynamic range (an upper limit value and a lower limit value). In the neuromorphic element, a weight based on the controlled value of the characteristic is applied to a signal in a range of a characteristic of the neuromorphic element (in the present embodiment, a range between an upper limit value and a lower limit value of a conductance). Thereby, in the element array unit 12 (element array 121), processing of a neural network constituted by the element array unit 12 (for example, processing for identifying an identification target to be input) is realized.

In the neural network system 1 according to the present embodiment, it is possible to improve the accuracy of results in a case where a neuromorphic element is used for a product-sum operation in a neural network.

For example, in a case where a neural network is realized using a neuromorphic element, it is assumed that a connection weight obtained by learning is standardized and allocated to an output range (dynamic range) of the neuromorphic element. In this case, a change in a characteristic of the neuromorphic element has a step shape, and thus a quantization error occurs.

In addition, for example, in an error inverse propagation method used for updating of a weight in a neural network, an updating amount of a weight depends on an absolute value of input data or teacher data, and a dynamic range that can be taken by a weight is different for each layer. Further, the updating amount of a weight depends on an algorithm used for updating of a weight.

Consequently, in the neural network system 1 according to the present embodiment, a weight value to be allocated to a neuromorphic element is appropriately set in consideration of the influence of a quantization error on identification performance of a neural network. Thereby, in the neural network system 1 according to the present embodiment, it is possible to suppress the deterioration of identification performance in a neural network using a neuromorphic element.

Here, even when a dynamic range narrower than a dynamic range obtained according to arithmetic results through a simulation using a real number is set in a neuromorphic element, an identification accuracy in a neural network using the neuromorphic element may be improved.

Further, in the neural network system 1 according to the present embodiment, a smaller (narrower) dynamic range is set as compared to a layer (in the present embodiment, a second layer from an output of a hidden layer to an output of an output layer) at a latter stage with respect to a layer close to an input (in the present embodiment, a first layer from the input layer to the output of the hidden layer) in a multilayer neural network. In the present embodiment, it is considered that the accuracy on the side of an input layer having a large number of units is more important than that of a layer at a latter stage, and thus a quantization step size is set to be small (that is, with a high arithmetic accuracy) on the input layer side.

Here, in the present embodiment, image data of a number is used as an object to be identified by a neural network (identification target), but any data may be used as an identification target.

In addition, any type of neural network may be used as a neural network, and for example, a fully connected neural network, a convolutional neural network, a recursive neural network, or the like may be used.

Further, in the present embodiment, a case where a dynamic range of a neuromorphic element used for a product-sum operation for realizing a neural network is set has been described, but configurations similar to that in the present embodiment may be applied to fields other than a neural network.

For example, a configuration similar to that in the present embodiment may be applied to an array (product-sum operation array) for performing a product-sum operation in any field, an analog arithmetic device including a product-sum operation in any field, and the like.

In addition, various resolutions may be used as a resolution of a neuromorphic element included in an array. For example, in a case where the array includes a plurality of layers including a neuromorphic element, a neuromorphic element having a common resolution (the same resolution) may be included in each of the layers. Further, in such a case, a configuration in which the resolution of a neuromorphic element in a different layer is different may be used. That is, a configuration in which the resolutions of a plurality of neuromorphic elements included in the same layer are the same may be used, a configuration in which a resolution is different when a layer included in a neuromorphic element is different may be used, and both the configurations may be used.

Meanwhile, processing may be performed by recording programs for realizing functions of devices (for example, the controller 11) according to the above-described embodiment in a computer-readable recording medium (storage medium) and causing a computer system to read and execute the programs recorded in the recording medium.

Meanwhile, the "computer system" as mentioned herein may include hardware such as an operating system (OS) and peripheral devices.

In addition, the "computer-readable recording medium" refers to a writable non-volatile memory such as a flexible disc, a magneto-optical disc, a read only memory (ROM), or a flash memory, or a portable medium such as a digital versatile disc (DVD), or a storage device such as a hard disk built into the computer system. Further, the recording medium may be, for example, a recording medium in which data is temporarily recorded.

Further, the "computer-readable recording medium" may also include a medium that holds the programs for a fixed period of time such as a volatile memory (dynamic random access memory (DRAM)) inside the computer system serving as a server or a client in a case where the programs are transmitted through a network such as the Internet or through a communication line such as a telephone line.

In addition, the above-described programs may be transmitted from the computer system in which the programs are stored in a storage device or the like to another computer system through a transmission medium or by transmitted waves in the transmission medium. Here, the "transmission medium" transmitting the programs refers to a medium having a function of transmitting information like a network (communication network) such as the Internet or a communication line (communication wire) such as a telephone line.

In addition, the above-described programs may be programs for realizing some of the above-described functions. Further, the above-described programs may be so-called differential files (differential programs) capable of realizing the above-described functions in combination with programs which are recorded in the computer system in advance.

Configuration Example

As a configuration example, there is provided a controller (in the present embodiment, the controller 11) of an array (in the present embodiment, the element array 121) including a neuromorphic element that multiplies a weight based on a value of a variable characteristic (for example, a conductance or the like) by a signal, the controller including a control unit (in the present embodiment, a function of the controller 11, for example, the weight allocation control unit 23) that controls the characteristic of the neuromorphic element by using a discretization step size obtained so that a predetermined condition (a predetermined condition for reducing an error or a predetermined condition for increasing an accuracy) is satisfied on the basis of a case where a true value (in the present embodiment, a true value arithmetically operated by a real number simulator) of the weight obtained with higher accuracy than a resolution of the characteristic of the neuromorphic element is used and a case where a discretization step size (in the present embodiment, parameters α and β corresponding to the discretization step size) which is set for the characteristic of the neuromorphic element is used.

As a configuration example, in the controller, the control unit controls the characteristic of the neuromorphic element by using a dynamic range of the neuromorphic element based on the discretization step size, the resolution, and a predetermined offset quantity.

As a configuration example, in the controller, the control unit controls the characteristic of the neuromorphic element by using the discretization step size which is common to a plurality of layers in a case were the array includes the plurality of layers each including the neuromorphic element.

As a configuration example, in the controller, the control unit controls the characteristic of the neuromorphic element by using the discretization step size which is common to groups into which a plurality of the neuromorphic elements included in the same layer are divided, in a case where the array includes a layer including the plurality of neuromorphic elements.

As a configuration example, in the controller, the array includes a plurality of layers including the neuromorphic element, the neuromorphic element having a resolution which is common to the layers is provided, and the resolution of the neuromorphic element in a different layer is different.

As a configuration example, in the controller, the control unit (in the present embodiment, the function of the controller 11, for example, the identification control unit 21, the weight arithmetic operation control unit 22, and the weight allocation control unit 23) performs learning on the array by using the discretization step size.

As a configuration example, in the controller, the array includes a circuit that performs a product-sum operation in a neural network by using the neuromorphic element.

As a configuration example, there is provided an arithmetic operation method (for example, an arithmetic operation method performed by the weight arithmetic operation control unit 22 of the controller 11 or another computer) of arithmetically operating a discretization step size of a characteristic of a neuromorphic element for an array including the neuromorphic element that multiplies a weight based on a value of a variable characteristic by a signal, the arithmetic operation method for a discretization step size including a step of arithmetically operating a true value of the weight with higher accuracy than a resolution of the characteristic of the neuromorphic element, and a step of arithmetically operating a discretization step size so that a predetermined condition (a predetermined condition for reducing an error or a predetermined condition for increasing an accuracy) is satisfied on the basis of a case where the true value of the weight is used and a case where the discretization step size which is set for the characteristic of the neuromorphic element is used.

As a configuration example, there is provided a program for arithmetically operating a discretization step size of a characteristic of a neuromorphic element (for example, a program executed in a computer constituting the weight arithmetic operation control unit 22 of the controller 11 or another computer) for an array including the neuromorphic element that multiplies a weight based on a value of a variable characteristic by a signal, the program causing a computer to execute a step of arithmetically operating a true value of the weight with higher accuracy than a resolution of the characteristic of the neuromorphic element, and a step of arithmetically operating a discretization step size so that a predetermined condition (a predetermined condition for reducing an error or a predetermined condition for increasing an accuracy) is satisfied on the basis of a case where the true value of the weight is used and a case where the discretization step size which is set for the characteristic of the neuromorphic element is used.

Here, in the computer, a processor such as a central processing unit (CPU) reads out and executes programs stored in a memory.

The above-described neural network system can function as various sensors and the brain of a robot. When a signal output from a sensor is input to a controller using the neural network system, the controller can function as an edge element. A sensor signal generally includes much noise, and a sensor signal desired to be obtained by a general sensor module can be extracted from noise. Therefore, a method of removing noise from a time-series signal of a sensor signal by using, for example, a signal processing technique and extracting a signal desired to be obtained is taken. In this case, signals other than the obtained signal only consumes energy and do not generate information. Highly accurate recognition can be performed by inputting a sensor signal to a controller using the neural network system. In the related art, an observation signal in which noise is superimposed on a source signal is separated into the source signal and the noise to be extracted as meaningful information for the first time. However, when this controller is used, a source signal desired to be obtained can be predicted from a time-series signal including noise and can be extracted as a meaningful signal even an output strength and statistics of the source signal are small. This is a module in which the sensor and the control device are integrated with each other and can be configured as an AI edge sensor module.

When this controller is used, information can be extracted with a smaller arithmetic operation function than that in the related art in order to increase the accuracy of recognition, and it is possible to achieve low cost, power saving, and volume saving.

It is also preferable to input signals of a plurality of sensors to this controller at the same time.

It is possible to obtain recognition related to a relation between the sensors by inputting the signals of the plurality of sensors at the same time. For example, when sensors are installed in hands, feet, and a body of a robot and signals from the sensors are simultaneously input to this controller, information such as whether the robot is walking or has fallen can be determined synthetically using the signals. Further, in a robot, a car, or the like in which a plurality of AI edge sensor modules are installed, power saving and high functions can be expected by simultaneously inputting signals to this controller. In a case where a plurality of sensors are sensors of different types, it is necessary to install a controller coping with voltages and currents that can cope with the respective sensors. In this case, a transformer, an AD converter, or the like is required for an interface of the controller, and energy is consumed due to energy conversion. Although energy is similarly consumed in the AI edge sensor module, a signal output from the AI edge sensor module to a central controller is subjected to certain recognition and identification by the AI edge sensor module, and only necessary information can be sent. Communication between the AI edge sensor module and the central controller can be reduced by these functions, so that energy consumption as a whole system can be reduced.

Although the embodiment of the present disclosure has been described in detail with reference to the drawings, a specific configuration is not limited to the embodiment, and changes of design and the like are also included without departing from the scope of the present disclosure.

INDUSTRIAL APPLICABILITY

According to the present disclosure, it is possible to improve the accuracy of results in a case where a neuromorphic element is used for a product-sum operation.

REFERENCE SIGNS LIST

1 Neural network system
11 Controller
12 Element array unit
21 Identification control unit
22 Weight arithmetic operation control unit
23 Weight allocation control unit
24 Storage unit
101 Neural network circuit
111 Identification control circuit
112 Weight arithmetic operation control circuit
113 Weight allocation control circuit
121 Element array
122, 123 INPUT/OUTPUT IF CIRCUIT
211 Image (image data)
1011, 1111 to 1113, 1121 to 1123, 1211, 1311 to 1313, 1321 to 1323, 1411 to 1413, 1421 to 1423, 1511 to 1513, 1521 to 1523, 1611 to 1613, 1621 to 1623, 1711 Characteristic
1131, 1132 Range
1221, 1721 Arrow
A1-0 to A1-$p$, A1-$i$, A2-0 to A2-$q$, A2-$j$, A3-1 to A3-$r$, A3-$k$ Unit
B1-1 to B1-$n$, B2-1 to B2-$n$, B0-1 to B0-$n$ Image

The invention claimed is:

1. A method of arithmetically operating a discretization step size of a variable conductance of a neuromorphic element for an array including the neuromorphic element that multiplies a weight based on a value of the variable conductance by a signal, the arithmetic operation method comprising:
a step of performing an arithmetic operation with a true value of the weight with higher accuracy than a resolution of the variable conductance of the neuromorphic element;
a step of performing an arithmetic operation with a discretization step size so that a predetermined condition for reducing an error or a predetermined condition for improving accuracy is satisfied on the basis of a case where the true value of the weight is used and a case where the discretization step size which is set for the variable conductance of the neuromorphic element is used; and
a step of controlling the variable conductance of a neuromorphic element by using a controller of the array including the neuromorphic element that multiplies the weight based on the value of the variable conductance by the signal, the controller comprising:
a control unit that controls the variable conductance of the neuromorphic element by using the discretization step size obtained so that the predetermined condition for reducing the error or the predetermined condition for improving accuracy is satisfied on the basis of the case where the true value of the weight obtained with higher accuracy than the resolution of the variable conductance of the neuromorphic element is used and the case where the discretization step size which is set for the variable conductance of the neuromorphic element is used.

2. The method of arithmetically operating a discretization step size according to claim 1,
wherein the control unit controls the variable conductance of the neuromorphic element by using a dynamic range of the neuromorphic element based on the discretization step size, the resolution, and a predetermined offset quantity.

3. The method of arithmetically operating a discretization step size according to claim 2,
wherein the control unit controls the variable conductance of the neuromorphic element by using the discretization step size, wherein the discretization step size is common to a plurality of layers is common to a plurality of layers in a case where the array includes the plurality of layers each including the neuromorphic element.

4. The method of arithmetically operating a discretization step size according to claim 2,
wherein the control unit controls the variable conductance of the neuromorphic element by using the discretization step size, wherein the discretization step size is common to groups into which a plurality of the neuromorphic elements included in the same layer are divided, in a case where the array includes a layer including the plurality of neuromorphic elements.

5. The method of arithmetically operating a discretization step size according to claim 1,
wherein the control unit controls the variable conductance of the neuromorphic element by using the discretization step size, wherein the discretization step size is common to a plurality of layers in a case where the array includes the plurality of layers each including the neuromorphic element.

6. The method of arithmetically operating a discretization step size according to claim 1,
wherein the control unit controls the variable conductance of the neuromorphic element by using the discretization step size, wherein the discretization step size is common to groups into which a plurality of the neuromorphic elements included in the same layer are divided, in a case where the array includes a layer including the plurality of neuromorphic elements.

7. The method of arithmetically operating a discretization step size according to claim 1,
wherein the array includes a plurality of layers including the neuromorphic element, the neuromorphic element having the resolution which is common to the layers is provided, and the resolution of the neuromorphic element in a different layer is different.

8. The method of arithmetically operating a discretization step size according to claim 1, wherein the control unit performs learning on the array by using the discretization step size.

9. The method of arithmetically operating a discretization step size according to claim 1, wherein the array includes a circuit that performs a product-sum operation in a neural network by using the neuromorphic element.

10. A non-transitory computer readable storage medium that stores a program for arithmetically operating a discretization step size of a variable conductance of a neuromorphic element for an array including the neuromorphic element that multiplies a weight based on a value of the variable conductance by a signal, the program causing a computer to execute steps comprising:
a step of performing an arithmetic operation with a true value of the weight with higher accuracy than a resolution of the variable conductance of the neuromorphic element;
a step of performing an arithmetic operation with a discretization step size so that a predetermined condition for reducing an error or a predetermined condition for improving accuracy is satisfied on the basis of a case where the true value of the weight is used and a case where the discretization step size which is set for the variable conductance of the neuromorphic element is used; and a step of controlling the variable conductance of a neuromorphic element by using a controller of the array including the neuromorphic element that multiplies the weight based on the value of the variable conductance by the signal, the controller comprising:

a control unit that controls the variable conductance of the neuromorphic element by using the discretization step size obtained so that the predetermined condition for reducing the error or the predetermined condition for improving accuracy is satisfied on the basis of the case where the true value of the weight obtained with higher accuracy than the resolution of the variable conductance of the neuromorphic element is used and the case where the discretization step size which is set for the variable conductance of the neuromorphic element is used.

* * * * *